United States Patent [19]

Igarashi et al.

[11] Patent Number: 4,992,150

[45] Date of Patent: Feb. 12, 1991

[54] PROCESS FOR PREPARING OIL-SOLUBLE NITROGEN-CONTAINING COMPOUNDS

[75] Inventors: Jinichi Igarashi, Tokyo; Harumichi Watanabe, Yokohama, both of Japan

[73] Assignee: Nippon Oil Co, Ltd., Tokyo, Japan

[21] Appl. No.: 337,622

[22] Filed: Apr. 13, 1989

Related U.S. Application Data

[63] Continuation of Ser. No. 914,467, Oct. 2, 1986, abandoned.

[30] Foreign Application Priority Data

Oct. 9, 1985 [JP] Japan .................................. 60-223827
Jun. 10, 1986 [JP] Japan .................................. 61-132789

[51] Int. Cl.$^5$ ............................................. C07C 283/00
[52] U.S. Cl. ........................... 204/157.81; 204/157.82; 564/291; 564/463; 564/485; 564/445; 564/447; 564/479; 548/485; 548/400; 546/184; 546/246; 546/248
[58] Field of Search ...................... 204/157.81, 157.82; 564/291, 463, 485, 445, 447, 479; 548/485, 400; 546/184, 246, 248

[56] References Cited

U.S. PATENT DOCUMENTS

| | | | |
|---|---|---|---|
| 2,772,271 | 11/1956 | Urry | 204/157.81 |
| 3,254,025 | 5/1966 | Suer | 252/49.6 |
| 3,322,670 | 5/1967 | Burt | 548/520 |
| 3,413,278 | 1/1968 | Weinrich | 564/463 |
| 3,492,353 | 1/1970 | Dix | 204/157.81 |

Primary Examiner—John F. Niebling
Assistant Examiner—Steven P. Marquis
Attorney, Agent, or Firm—Bucknam and Archer

[57] ABSTRACT

A process for preparing oil-soluble nitrogen-containing compounds which comprises subjecting nitrogen-containing telogens and alpha-olefin taxogens to radical telomerization reaction. The nitrogen-containing compounds are mixtures of telomers having an average molecular weight not less than 300 and a nitrogen content of from 0.1 to 10 wt %. The compound may be further reacted with boron-bearing compounds or boron compounds to obtain oil-soluble nitrogen and boron-containing compounds. These compounds are useful as additives for fuel oils and lubricating oils.

15 Claims, No Drawings

PROCESS FOR PREPARING OIL-SOLUBLE NITROGEN-CONTAINING COMPOUNDS

This is a continuation of application Ser. No. 914,467, filed Oct. 2, 1986 now abandoned.

BACKGROUND OF THE INVENTION

1. Field of the Invention

This invention relates to a process for preparing oil-soluble nitrogen-containing compounds which are particularly useful as additives for fuel oils and lubricating oils, thus imparting good detergency, dispersability, corrosion resistance, rust-preventing property and lubricity to the oils. The above-mentioned nitrogen-containing compounds cover not only nitrogen-containing compounds having improved properties but also both nitrogen and boron-containing compounds having more improved properties.

2. Description of the Prior Art

It is known that when certain types of basic compounds having nitrogen atoms therein are added to fuel oils and lubricating oils, the oils will be provided with various properties such as, for example, excellent detergency, dispersability, corrosion resistance, rust-preventiveness and friction reducibility.

For instance, alkenyl succinimides of alkylene polyamines described in U.S. Pat. No. 3,172,892 and copolymers of methacrylic esters and nitrogen-containing basic monomers described in U.S. Pat. No. 2,737,496 are known as a good detergent-dispersant of petroleum products. Aliphatic amines such as oleylamine have wide utility as a good corrosion preventive or a friction reducing agent for petroleum products. These nitrogen-containing compounds are so-called oil-soluble surface active agents and consist generally of long-chain organic residue portions serving as oleophilic groups and nitrogen-containing compound portions serving as polar groups. A variety of such compounds have been developed using different types of oleophilic groups and polar groups and different manners of introduction thereof. However, the introduction of the long-chain organic residue, used as the oleophilic group, into the resulting nitrogen-containing compounds is not easy especially when the oleophilic group is a long-chain hydrocarbon group. Generally, two or three reaction steps are required for the introduction. For instance, in the above-mentioned U.S. Pat. No. 3,172,892, the alkenyl succinimides of alkylene polyamines are obtained by the steps of cation polymerization of isobutylene to obtain polybutene, reaction of the polybutene with maleic anhydride to obtain polybutenylsuccinic anhydride, and further reaction with alkylene polyamines to obtain the alkenyl succinimides.

Thus, the conventional processes for preparing oil-soluble nitrogen-containing compounds having long-chain hydrocarbon groups present the problem of needing a number of reaction steps. With the alkenyl succinimides, the imido bonding adversely influences the demulsibility as an additive.

Moreover, it is known that when the nitrogen-containing compounds are borated or coordinated with boron, they will be further improved in corrosion resistance, rust-preventive property and friction reducibility while maintaining their functions as a detergent and a dispersant. In addition, oxidation and wear resistances are imparted to the compounds.

For instance, U.S. Pat. Nos. 3,087,936, 3,254,025 and 3,322,670 disclose borated alkenylsuccinimides which have not only good detergency and dispersability derived from the alkenylsuccinimides, but also high corrosion and wear resistances. Compounds obtained by borating aliphatic amines such as oleylamine have been improved in friction reducibility of the original aliphatic amines and are newly provided with corrosion resistance.

When oil-soluble nitrogen-containing compounds such as alkenyl succinimides and oleylamine are borated or coordinated with boron, the resulting compounds show greatly improved functions as additives for petroleum products. However, these borated compounds have the following problems.

The borated alkenyl succinimides have very poor demulsibility similar to the starting alkenylsuccinimides and thus, cannot be used as additives for lubricating oils such as working oils or gear oils, which require high demulsibility. Further, these borated compounds may unfavorably cause emulsion sludges when used in engine oils.

On the other hand, borated compounds of aliphatic amines such as oleylamine are low in oil solubility due to the boration, so that it is almost impossible to add them to fuel oils or lubricating oils in large amounts.

As will be appreciated from the foregoing, the known oil-soluble nitrogen and boron-containing compounds present many problems with respect to their properties.

SUMMARY OF THE INVENTION

It is therefore an object of the present invention to provide a process for preparing nitrogen-containing compounds having at least one high molecular weight hydrocarbon group by a simple one-step reaction procedure.

It is another object of the invention to provide a process for preparing a variety of oil-soluble nitrogen-containing compounds by a simple manner.

It is a further object of the invention to provide a process for preparing oil-soluble nitrogen and boron-containing compounds which have significantly improved wear reducibility, good wear resistance and good extreme pressure lubricity while keeping the characteristic properties of the original nitrogen-containing compounds.

The above objects can be achieved, in one aspect of the invention, by a process which comprises subjecting, to radical telomerization, a mixture of (1) 1 mole of a nitrogen-containing compound of the general formula used as a telogen

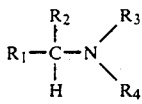

in which $R_1$, $R_2$, $R_3$ and $R_4$ independently represent a hydrogen atom or a hydrocarbon group having from 1 to 45 carbon atoms in which 1 to 4 hydrogen atoms are each unsubstituted or substituted with an amino group or a hydroxyl group or in which 1 to 10 carbon atoms are each unsubstituted or substituted with a nitrogen atom or an oxygen atom provided that $R_1$ and $R_2$ or $R_1$ and $R_3$ are able to combine to form a ring, and (2) 0.1 to 20 moles of an alpha-olefin of the following general formula used as a taxogen

in which $R_5$ represents a hydrogen atom or an alkyl group having from 1 to 28 carbon atoms, thus obtaining an oil-soluble nitrogen-containing product having a high molecular weight hydrocarbon group, an average molecular weight of not less than 300 and a nitrogen content of from 0.1 to 10 wt %. As a matter of course, the radical telomerization is effected under conditions of generating radicals by suitable means.

In another aspect of the invention, the resulting nitrogen-containing compounds may further be reacted with a boron compound at a temperature of from 50° to 250° C. By the reaction, there is obtained an oil-soluble nitrogen and boron-containing compound having an average molecular weight of not less than 300, a nitrogen content of from 0.1 to 10 wt % and a boron content of from 0.05 to 7.0 wt %.

DETAILED DESCRIPTION AND EMBODIMENTS OF THE INVENTION

The telogen, which is one of the compounds used in the process of the invention, is a nitrogen-containing ingredient of the following general formula (I)

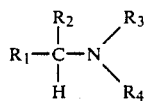

(I)

As defined above, $R_1$, $R_2$, $R_3$ and $R_4$ may be the same or different and represent a hydrogen atom or a hydrocarbon group having from 1 to 45 carbon atoms. The hydrocarbon group may be substituted with an amino group or a hydroxyl group for 1 to 4 hydrogen atoms or may be substituted with a nitrogen atom or an oxygen atom for 1 to 10 carbon atoms. Alternatively, $R_1$ and $R_2$ or $R_1$ and $R_3$ may combine to form a ring.

The ingredient (1) may be any nitrogen-containing ones of the above general formula (I). Preferably, there are mentioned alkylamines, cycloalkylamines, alkanolamines, cycloalkanolamines, heterocyclic amines, diamines, polyamines and mixtures thereof.

The alkylamines and cycloalkylamines are compounds of the general formula (II).

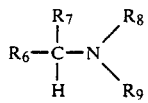

(II)

In the general formula (II), $R_6$, $R_7$, $R_8$ and $R_9$ may be the same or different and represent a hydrogen atom or an alkyl group having from 1 to 45, preferably from 1 to 24, more preferably from 1 to 12 carbon atoms for the alkylamine. For the cycloalkylamine, $R_6$ and $R_7$ join to form a five to seven-membered, preferably six-membered, saturated aliphatic ring. In the ring, from 1 to 3, preferably from 1 to 2, hydrogen atoms may be substituted with an alkyl group having from 1 to 6 carbon atoms, preferably from 1 to 4 carbon atoms, $R_8$ and $R_9$ may be the same or different and represent a hydrogen atom or an alkyl group having from 1 to 45, preferably from 1 to 24, more preferably 1 to 8, carbon atoms.

Of the compounds of the general formula (II), both alkylamines of the formula in which at least $R_7$ and $R_8$ are respectively a hydrogen atom and cycloalkylamines in which at least $R_8$ is a hydrogen atom are preferred in view of the high radical telomerization reactivity.

Examples of the preferable alkylamines of the general formula (II) include methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, nonadecylamine, eicosylamine, heneicosylamine, docosylamine, tricosylamine, tetracosylamine, dimethylamine, N-methylethylamine, diethylamine, N-methylpropylamine, N-ethylpropylamine, dipropylamine, N-methylbutylamine, N-ethylbutylamine, N-propylbutylamine, dibutylamine, N-methylpentylamine, N-ethylpentylamine, N-propylpentylamine, N-butylpentylamine, dipentylamine, N-methylhexylamine, N-ethylhexylamine, N-propylhexylamine, N-butylhexylamine, N-pentylhexylamine, dihexylamine, N-methylheptylamine, N-ethylheptylamine, N-propylheptylamine, N-butylheptylamine, N-pentylheptylamine, N-hexylheptylamine, diheptylamine, N-methyloctylamine, N-ethyloctylamine, N-propyloctylamine, N-butyloctylamine, N-pentyloctylamine, N-hexyloctylamine, N-heptyloctylamine, dioctylamine, N-methylnonylamine, N-ethylnonylamine, N-propylnonylamine, N-butylnonylamine, N-pentylnonylamine, N-hexylnonylamine, N-heptylnonylamine, N-octylnonylamine, dinonylamine, N-methyldecylamine, N-ethyldecylamine, N-propyldecylamine, N-butyldecylamine, N-pentyldecylamine, N-hexyldecylamine, N-heptyldecylamine, N-octyldecylamine, N-nonyldecylamine, didecylamine, N-methyldodecylamine, ethyldodecylamine, N-propyldodecylamine, N-butyldodecylamine, N-pentyldodecylamine, N-hexyldodecylamine, N-heptyldodecylamine, N-octyldodecylamine, N-nonyldodecylamine, N-decyldodecylamine, didodecylamine, N-methyltetradecylamine, N-ethyltetradecylamine, N-propyltetradecylamine, N-butyltetradecylamine, N-pentyltetradecylamine, N-hexyltetradecylamine, N-heptyltetradecylamine, N-octyltetradecylamine, N-nonyltetradecylamine, N-decyltetradecylamine, N-dodecyltetradecylamine, ditetradecylamine, N-methylhexadecylamine, N-ethylhexadecylamine, N-propylhexadecylamine, N-butylhexadecylamine, N-pentylhexadecylamine, N-hexylhexadecylamine, N-heptylhexadecylamine, N-octylhexadecylamine, N-nonylhexadecylamine, N-decylhexadecylamine, N-dodecylhexadecylamine, N-tetradecylhexadecylamine, dihexadecylamine, N-methyloctadecylamine, N-ethyloctadecylamine, N-propyloctadecylamine, N-butyloctadecylamine, N-pentyloctadecylamine, N-hexyloctadecylamine, N-heptyloctadecylamine, N-octyloctadecylamine, N-nonyloctadecylamine, N-decyloctadecylamine, N-dodecyloctadecylamine, N-tetradecyloctadecylamine, N-hexadecyloctadecylamine, dioctadecylamine, N-methyleicosylamine, N-ethyleicosylamine, N-propyleicosylamine, N-butyleicosylamine, N-pentyleicosylamine, N-hexyleicosylamine, N-heptyleicosylamine, N-octyleicosylamine, N-nonyleicosylamine, N-decyleicosylamine, N-dodecyleicosylamine, N-tetradecyleicosylamine, N-hexadecyleicosylamine, N-octadecyleicosylamine, dieicosylamine, N-methyldocosylamine, N-ethyldocosylamine, N-propyldocosylamine, N-butyldocosylamine, N-pentyldocosylamine, N-hexyldocosylamine, N-heptyldocosylamine, N-octyldocosylamine, N-nonyldocosylamine, N-decyldocosylamine, N-dodecyldocosylamine, N-tetradecyldocosylamine, N-hexadecyldocosylamine, N-octadecyldocosylamine, N-eicosyldocosylamine, didocosylamine, N-methyltetracosylamine, N-ethyltetracosylamine, N-propyltetracosylamine, N-butyltetracosylamine, N-pentyltetracosylamine, N-hexyltetracosylamine, N-heptyltetracosylamine, N-octyltetracosylamine, N-nonyltetracosylamine, N-decyltetracosylamine, N-dodecyltetracosylamine, N-tetradecyltetracosylamine, N-hexadecyltetracosylamine, N-octadecyltetracosylamine, N-eicosyltetracosylamine, N-docosyltetracosylamine, ditetracosylamine and mixtures thereof. Preferable examples of the cycloalkylamines of the general formula (II) include cyclopentylamine, methylcyclopentylamine, ethylcyclopentylamine, propylcyclopentylamine, butylcyclopentylamine, dimethylcyclopentylamine, diethylcyclopentylamine, cyclohexylamine, methylcyclohexylamine, ethylcyclohexylamine, propylcyclohexylamine, butylcyclohexylamine, dimethylcyclohexylamine, diethylcyclohexylamine, cycloheptylamine, methylcycloheptylamine, ethylcycloheptylamine, propylcycloheptylamine, butylcycloheptylamine, dimethylcycloheptylamine, diethylcycloheptylamine, N-methylcyclopentylamine, N-ethylcyclopentylamine, N-propylcyclopentylamine, N-butylcyclopentylamine, N-pentylcyclopentylamine, N-hexylcyclopentylamine, N-heptylcyclopentylamine, N-octylcyclopentylamine, N-nonylcyclopentylamine, N-decylcyclopentylamine, N-dodecylcyclopentylamine, N-tetradecylcyclopentylamine, N-hexadecylcyclopentylamine, N-octadecylcyclopentylamine, N-eicosylcyclopentylamine, N-methylcyclohexylamine, N-ethylcyclohexylamine, N-propylcyclohexylamine, N-butylcyclohexylamine, N-pentylcyclohexylamine, N-hexylcyclohexylamine, N-heptylcyclohexylamine, N-octylcyclohexylamine, N-nonylcyclohexylamine, N-decylcyclohexylamine, N-dodecylcyclohexylamine, N-tetradecylcyclohexylamine, N-hexadecylcyclohexylamine, N-octadecylcyclohexylamine, N-eicosylcyclohexylamine, N-methylcycloheptylamine, N-ethylcycloheptylamine, N-propylcycloheptylamine, N-butylcycloheptylamine, N-pentylcyclohexylamine, N-hexylcycloheptylamine, N-heptylcycloheptylamine, N-octylcycloheptylamine, N-nonylcycloheptylamine, N-decylcycloheptylamine, N-dodecylcycloheptylamine, N-tetradecylcycloheptylamine, N-hexadecylcycloheptylamine, N-octadecylcycloheptylamine, N-eicosylcycloheptylamine and mixtures thereof.

The alkanolamines are compounds of the following general formula (III)

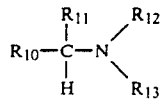

In the formula (III), $R_{10}$ represents an alkanol group having one or more hydroxyl groups, preferably one hydroxyl group, and from 1 to 45 carbon atoms, preferably from 1 to 24 carbon atoms, more preferably from 1 to 12 carbon atoms, and $R_{11}$, $R_{12}$ and $R_{13}$ may be the same or different and represent a hydrogen atom, an alkyl group having from 1 to 45 carbon atoms, preferably from 1 to 24 carbon atoms, more preferably from 1 to 12 carbon atoms, or an alkanol group having one or more hydroxyl groups, preferably one hydroxyl group and from 1 to 45 carbon atoms, preferably from 1 to 24 carbon atoms, more preferably from 1 to 12 carbon atoms. With the cycloalkanol amines, $R_{10}$ and $R_{11}$ join to form a five to seven-membered, preferably six-membered, saturated aliphatic ring having one or more hydroxyl groups, preferably one hydroxyl group, and in which alkyl groups having from 1 to 6 carbon atoms, preferably from 1 to 4 carbon atoms, may be substituted for from 1 to 3 hydrogen atoms, preferably from 1 to 2 hydrogen atoms. $R_{12}$ and $R_{13}$ may be the same or different and represent a hydrogen atom, an alkyl group having from 1 to 45 carbon atoms, preferably from 1 to 24 carbon atoms, more preferably 1 to 12 carbon atoms, or an alkanol group having one or more hydroxyl group, preferably one hydroxyl group and having from 1 to 45 carbon atoms, preferably from 1 to 24 carbon atoms.

Of the compounds of the general formula (III), alkanolamines of the formula in which at least $R_{11}$ and $R_{12}$ are, respectively, a hydrogen atom and cycloalkanolamines of the formula in which at least $R_{12}$ is a hydrogen atom are preferred because of the high radical telomerization reactivity.

Preferable examples of the alkanolamines of the formula (III) include ethanolamine, propanolamine, butanolamine, pentanolamine, hexanolamine, heptanolamine, octanolamine, nonanolamine, decanolamine, undecanolamine, dodecanolamine, tridecanolamine, tetradecanolamine, pentadecanolamine, hexadecanolamine, heptadecanolamine, octadecanolamine, nonadecanolamine, eicosanolamine, heneicosanolamine, docosanolamine, tricosanolamine, tetracosanolamine, N-methylethanolamine, N-ethylethanolamine, N-methylpropanolamine, N-ethylpropanolamine, N-propylpropanolamine, N-methylbutanolamine, N-ethylbutanolamine, N-propylbutanolamine, N-butylbutanolamine, N-methylpentanolamine, N-ethylpentanolamine, N-propylpentanolamine, N-butylpentanolamine, N-pentylpentanolamine, N-methylhexanolamine, N-ethylhexanolamine, N-propylhexanolamine, N-butylhexanolamine, N-pentylhexanolamine, N-hexylhexanolamine, N-methylheptanolamine, N-ethylheptanolamine, N-propylheptanolamine, N-butylheptanolamine, N-pentylheptanolamine, N-hexylheptanolamine, N-heptylheptanolamine, N-methyloctanolamine, N-ethyloctanolamine, N-propyloctanolamine, N-butyloctanolamine, N-pentyloctanolamine, N-hexyloctanolamine, N-heptyloctanolamine, N-octyloctanolamine, N-methylnonanolamine, N-ethylnonanolamine, N-propylnonanolamine, N-butylnonanolamine, N-butylnonanolamine, N-pentylnonanolamine, N-hexylnonanolamine, N-heptylnonanolamine, N-octylnonanolamine, N-nonylnonanolamine, N-methyldecanolamine, N-ethyldecanolamine, N-propyldecanolamine, N-butyldecanolamine, N-pentyldecanolamine, N-heptyldecanolamine, N-octyldecanolamine, N-nonyldecanolamine, N-decyldecanolamine, N-methyldodecanolamine, N-ethyldodecanolamine, N-propyldodecanolamine, N-butyldodecanolamine, N-pentyldodecanolamine, N-hexyldodecanolamine, N-heptyldodecanolamine, N-octyldodecanolamine, N-nonyldodecanolamine, N-decyldodecanolamine, N-dodecyldodecanolamine, N-methyltetradecanolamine, N-ethyltetradecanolamine, N-propyltetradecanolamine, N-butyltetradecanolamine, N-pentyltetradecanolamine, N-hexyltetradecanolamine, N-heptyltetradecanolamine, N-octyltetradecanolamine, N-nonyltetradecanolamine, N- decyltetradecanolamine, N-dodecyltetradecanolamine, N-tetradecyltetradecanolamine, N-methylhexadecanolamine, N-ethylhexadecanolamine, N-propylhexadecanolamine, N-butylhexadecanolamine, N-pentylhexadecanolamine, N-hexylhexadecanolamine, N-heptylhexadecanolamine, N-octylhexadecanolamine, N-nonylhexadecanolamine, N-decylhexadecanolamine, N-dodecylhexadecanolamine, N-tetradecylhexadecanolamine, N-hexadecylhexadecanolamine, N-methyloctadecanolamine, N-ethyloctadecanolamine, N-propyloctadecanolamine, N-butyloctadecanolamine, N-pentyloctadecanolamine, N-hexyloctadecanolamine, N-heptyloctadecanolamine, N-octyloctadecanolamine, N-nonyloctadecanolamine, N-decyloctadecanolamine, N-dodecyloctadecanolamine, N-tetradecyloctadecanolamine, N-hexadecyloctadecanolamine, N-octadecyloctadecanolamine, N-methyleicosanolamine, N-ethyleicosanolamine, N-propyleicosanolamine, N-butyleicosanolamine, N-pentyleicosanolamine, N-hexyleicosanolamine, N-heptyleicosanolamine, N-octyleicosanolamine, N-nonyleicosanolamine, N-decyleicosanolamine, N-dodecyleicosanolamine, N-tetradecyleicosanolamine, N-hexadecyleicosanolamine, N-octadecyleicosanolamine, N-eicosyleicosanolamine, N-methyldocosanolamine, N-ethyldocosanolamine, N-propyldocosanolamine, N-butyldocosanolamine, N-pentyldocosanolamine, N-hexyldocosanolamine, N-heptyldocosanolamine, N-octyldocosanolamine, N-nonyldocosanolamine, N-decyldocosanolamine, N-tetradecyldocosanolamine, N-hexadecyldocosanolamine, N-octadecyldocosanolamine, N-eicosyldocosanolamine, N-docosyldocosanolamine, diethanolamine, N-hydroxyethylpropanolamine, dipropanolamine, N-hydroxyethylbutanolamine, N-hydroxypropylbutanolamine, dibutanolamine, N-hydroxyethylpentanolamine, N-hydroxypropylpentanolamine, N-hydroxybutylpentanolamine, dipentanolamine, N-hydroxyethylhexanolamine, N-hydroxypropylhexanolamine, N-hydroxybutylhexanolamine, N-hydroxypentylhexanolamine, dihexanolamine, N-hydroxyethylheptanolamine, N-hydroxypropylheptanolamine, N-hydroxybutylheptanolamine, N-hydroxypentylheptanolamine, N-hydroxyhexylheptanolamine, diheptanolamine, N-hydroxyethyloctanolamine, N-hydroxypropyloctanolamine, N-hydroxybutyloctanolamine, N-hydroxypentyloctanolamine, N-hydroxyhexyloctanolamine, N-hydroxyheptyloctanolamine, dioctanolamine, N-hydroxyethylnonanolamine, N-hydroxypropylnonanolamine, N-hydroxybutylnonanolamine, N-hydroxypentylnonanolamine, N-hydroxyhexylnonanolamine, N-hydroxyheptylnonanolamine, N-hydroxyoctylnonanolamine, dinonanolamine, N-hydroxyethyldecanolamine, N-hydroxypropyldecanolamine, N-hydroxybutyldecanolamine, N-hydroxypentyldecanolamine, N-hydroxyhexyldecanolamine, N-hydroxyheptyldecanolamine, N-hydroxyoctyldecanolamine, N-hydroxynonyldecanolamine, didecanolamine, N-hydroxyethyldodecanolamine, N-hydroxypropyldodecanolamine, N-hydroxybutyldodecanolamine, N-hydroxypentyldodecanolamine, N-hydroxyhexyldodecanolamine, N-hydroxyheptyldodecanolamine, N-hydroxyoctyldodecanolamine, N-hydroxynonyldodecanolamine, N-hydroxydecyldodecanolamine, didodecanolamine, N-hydroxyethyltetradecanolamine, N-hydroxypropyltetradecanolamine, N-hydroxybutyltetradecanolamine, N-hydroxypentyltetradecanolamine, N-hydroxyhexyltetradecanolamine, N-hydroxyheptyltetradecanolamine, N-hydroxyoctyltetradecanolamine, N-hydroxynonyltetradecanolamine, N-hydroxydecyltetradecanolamine, N-hydroxydodecyltetradecanolamine, ditetradecanolamine, N-hydroxyethylhexadecanolamine, N-hydroxypropylhexadecanolamine, N-hydroxybutylhexadecanolamine, N-hydroxypentylhexadecanolamine, N-hydroxyhexylhexadecanolamine, N-hydroxyheptylhexadecanolamine, N-hydroxyoctylhexadecanolamine, N-hydroxynonylhexadecanolamine, N-hydroxydecylhexadecanolamine, N-hydroxydodecylhexadecanolamine, N-hydroxytetradecylhexadecanolamine, dihexadecanolamine, N-hydroxyethyloctadecanolamine, N-hydroxypropyloctadecanolamine, N-hydroxybutyloctadecanolamine, N-hydroxypentyloctadecanolamine, N-hydroxyhexyloctadecanolamine, N-hydroxyheptyloctadecanolamine, N-hydroxyoctyloctadecanolamine, N-hydroxynonyloctadecanolamine, N-hydroxydecyloctadecanolamine, N-hydroxydodecyloctadecanolamine, N-hydroxytetradecyloctadecanolamine, N-hydroxyhexadecyloctadecanolamine, dioctadecanolamine, N-hydroxyethyleicosanolamine, N-hydroxypropyleicosanolamine, N-hydroxybutyleicosanolamine, N-hydroxypentyleicosanolamine, N-hydroxyhexyleicosanolamine, N-hydroxyheptyleicosanolamine, N-hydroxyoctyleicosanolamine, N-hydroxynonyleicosanolamine, N-hydroxydecyleicosanolamine, N-hydroxydodecyleicosanolamine, N-hydroxytetradecyleicosanolamine, N-hydroxyhexadecyleicosanolamine, N-hydroxyoctadecyleicosanolamine, dieicosanolamine, N-hydroxyethyldocosanolamine, N-hydroxypropyldocosanolamine, N-hydroxybutyldocosanolamine, N-hydroxypentyldocosanolamine, N-hydroxyhexyldocosanolamine, N-hydroxyheptyldocosanolamine, N-hydroxyoctyldocosanolamine, N-hydroxynonyldocosanolamine, N-hydroxydecyldocosanolamine, N-hydroxydodecyldocosanolamine, N-hydroxytetradecyldocosanolamine, N-hydroxyhexadecyldocosanolamine, N-hydroxyoctadecyldocosanolamine, N-hydroxyeicosyldocosanolamine, didocosanolamine, N-hydroxyethyltetracosanolamine, N-hydroxypropyltetracosanolamine, N-hydroxybutyltetracosanolamine, N-hydroxypentyltetracosanolamine, N-hydroxyhexyltetracosanolamine, N-hydroxyheptyltetracosanolamine, N-hydroxyoctyltetracosanolamine, N-hydroxynonyltetracosanolamine, N-hydroxydecyltetracosanolamine, N-hydroxydodecyltetracosanolamine, N-hydroxytetradecyltetracosanolamine, N-hydroxyhexadecyltetracosanolamine, N-hydroxyoctadecyltetracosanolamine, N-hydroxyeicosyltetracosanolamine, N-hydroxydocosyltetracosanolamine, ditetracosanolamine and mixtures thereof.

Preferable examples of the cycloalkanolamines of the general formula (III) include cyclopentanolamine, methylcyclopentanolamine, ethylcyclopentanolamine, propylcyclopentanolamine, butylcyclopentanolamine, dimethylcyclopentanolamine, diethylcyclopentanolamine, cyclohexanolamine, methylcyclohexanolamine, ethylcyclohexanolamine, propylcyclohexanolamine, butylcyclohexanolamine, dimethylcyclohexanolamine, diethylcyclohexanolamine, cycloheptanolamine, methylcycloheptanolamine, ethylcycloheptanolamine, propylcycloheptanolamine, butylcycloheptanolamine, dimethylcycloheptanolamine, diethylcycloheptanolamine, N-methylcycloheptanolamine, N-ethylcycloheptanolamine, N-propylcyclopentanolamine, N-butylcyclopentanolamine, N-pentylcyclopentanolamine, N-hexylcyclopentanolamine, N-heptylcyclopentanolamine, N-octylcyclopentanolamine, N-nonylcyclopentanolamine, N-decylcyclopentanolamine, N-dodecylcyclopentanolamine, N-tetradecylcyclopentanolamine, N-hexadecylcyclopentanolamine, N-octadecylcyclopentanolamine, N-eicosylcyclopentanolamine, N-methylcyclohexanolamine, N-ethylcyclohexanolamine, N-propylcyclohexanolamine, N-butylcyclohexanolamine, N-pentylcyclohexanolamine, N-hexylcyclohexanolamine, N-heptylcyclohexanolamine, N-octylcyclohexanolamine, N-nonylcyclohexanolamine, N-decylcyclohexanolamine, N-dodecylcyclohexanolamine, N-tetradecylcyclohexanolamine, N-hexadecylcyclohexanolamine, N-octadecylcyclohexanolamine, N-eicosylcyclohexanolamine, N-methylcycloheptanolamine, N-ethylcycloheptanolamine, N-propylcycloheptanolamine, N-butylcycloheptanolamine, N-pentylcycloheptanolamine, N-hexylcycloheptanolamine, N-heptylcycloheptanolamine, N-octylcycloheptanolamine, N-nonylcycloheptanolamine, N-decylcycloheptanolamine, N-dodecylcycloheptanolamine, N-tetradecycycloheptanolamine, N-hexadecylcycloheptanolamine, N-octadecylcycloheptanolamine, N-eicosylcycloheptanolamine, N-hydroxyethylcyclopentanolamine, N-hydroxypropylcyclopentanolamine, N-hydroxybutylcyclopentanolamine, N-hydroxypentylcyclopentanolamine, N-hydroxyhexylcyclopentanolamine, N-hydroxyheptylcyclopentanolamine, N-hydroxyoctylcyclopentanolamine, N-hydroxynonylcyclopentanolamine, N-hydroxydecylcyclopentanolamine, N-hydroxydodecylcyclopentanolamine, N-hydroxytetradecylcyclopentanolamine, N-hydroxyhexadecylcyclopentanolamine, N-hydroxyoctadecylcyclopentanolamine, N-hydroxyeicosylcyclopentanol, N-hydroxyethylcyclohexanolamine, N-hydroxypropylcyclohexanolamine, N-hydroxybutylcyclohexanolamine, N-hydroxypentylcyclohexanolamine, N-hydroxyhexylcyclohexanolamine, N-hydroxyheptylcyclohexanolamine, N-hydroxyoctylcyclohexanolamine, N-hydroxynonylcyclohexanolamine, N-hydroxydecylcyclohexanolamine, N-hydroxydodecylcyclohexanolamine, N-hydroxytetradecylcyclohexanolamine, N-hydroxyhexadecylcyclohexanolamine, N-hydroxyoctadecylcyclohexanolamine, N-hydroxyeicosylcyclohexanolamine, N-hydroxyethylheptanolamine, N-hydroxypropylcycloheptanolamine, N-hydroxybutylcycloheptanolamine, N-hydroxypentylcycloheptanolamine, N-hydroxyhexylcycloheptanolamine, N-hydroxyheptylcycloheptanolamine, N-hydroxyoctylcycloheptanolamine, N-hydroxynonylcycloheptanolamine, N-hydroxydecylcycloheptanolamine, N-hydroxydodecylcycloheptanolamine, N-hydroxytetradecylcycloheptanolamine, N-hydroxyhexadecylcycloheptanolamine, N-hydroxyoctadecylcycloheptanolamine, N-hydroxyeicosylcycloheptanolamine, and mixtures thereof.

On the other hand, the heterocyclic amines are compounds of the following general formula (IV)

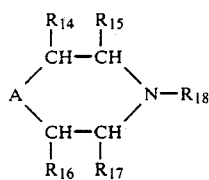

in which $R_{14}$, $R_{15}$, $R_{16}$ and $R_{17}$ may be the same or different and represent a hydrogen or an alkyl group having from 1 to 6, preferably from 1 to 3, carbon atoms. $R_{18}$ is a hydrogen atom, an aminoalkyl group which has from one or two, preferably one amino group having from 1 to 6, preferably from 1 to 3, carbon atoms and which has from 1 to 6, preferably from 1 to 3, carbon atoms, or a hydroxyalkyl group which has one or two hydroxyl groups, preferably one hydroxy group and which has from 1 to 6, preferably from 1 to 3, carbon atoms. A represents an alkylene group of the following general formula,

in which $R_{19}$ may be the same or different as $R_{14}$ to $R_{17}$ and is selected from the group consisting of those represented by $R_{14}$ to $R_{17}$, or an oxygen atom or a group of the following general formula,

in which $R_{20}$ may be the same or different as $R_{18}$ and is selected from the group consisting of those represented by $R_{18}$.

Preferable heterocyclic amines of the general formula (IV) include piperidine and piperidine derivatives such as N-methylpiperidine, N-ethylpiperidine, N-propylpiperidine, N-(beta-aminoethyl)piperidine, N-(beta-aminopropyl)piperidine, N-(gamma-aminopropyl)piperidine, N-(beta-hydroxyethyl)piperidine, N-(beta-hydroxypropyl)piperidine, N-(gamma-hydroxypropyl)piperidine, methylpiperidine, ethylpiperidine, dimethylpiperidine, N-methylmethylpiperidine, N-ethylmethylpiperidine, N-ethylethylpiperidine, N-ethyldimethylpiperidine, N-propylmethylpiperidine, N-(beta-aminoethyl)methylpiperidine, N-(beta-aminoethyl)ethylpiperidine, N-(beta-aminoethyl)dimethylpiperidine, N-(beta-aminopropyl)methylpiperidine, N-(beta-aminopropyl)ethylpiperidine, N-(beta-aminopropyl)dimethylpiperidine, N-(gamma-aminopropyl)methylpiperidine, N-(gamma-aminopropyl)ethylpiperidine, N-(gamma-aminopropyl)dimethylpiperidine, N-(beta-hydroxyethyl)methylpiperidine, N-(beta-hydroxyethyl)ethylpiperidine, N-(beta-hydroxyethyl)dimethylpiperidine, N-(beta-hydroxypropyl)methylpiperidine, N-(beta-hydroxypropyl)ethylpiperidine, N-(beta-hydroxypropyl)dimethylpiperidine, N-(gamma-hydroxypropyl)methylpiperidine, N-(gamma-hydroxypropyl)ethylpiperidine, N-(gamma-hydroxypropyl)dimethylpiperidine, and the like; morpholine and morpholine derivatives such as N-methylmorpholine, N-ethylmorpholine, N-(beta-aminoethyl)morpholine, N-(beta-aminopropyl)morpholine, N-(gamma-aminopropyl)morpholine, N-(beta-hydroxyethyl)morpholine, N-(beta-hydroxypropyl)morpholine, N-(gamma-hydroxypropyl)morpholine, methylmorpholine, ethylmorpholine, dimethylmorpholine, N-methylmethylmorpholine, N-methylethylmorpholine, N-methyldimethylmorpholine, N-ethylmethylmorpholine, N-ethylethylmorpholine, N-ethyldimethylmorpholine, N-propylmethylmorpholine, N-propylethylmorpholine, N-propyldimethylmorpholine, N-(beta-aminoethyl)methylmorpholine, N-(beta-aminoethyl)ethylmorpholine, N-(beta-aminoethyl)dimethylmorpholine, N-(beta-aminopropyl)methylmorpholine, N-(beta-aminopropyl)ethylmorpholine, N-(beta-aminopropyl)dimethylmorpholine, N-

(gamma-aminopropyl)methylmorpholine, N-(gamma-aminopropyl)ethylmorpholine, N-(gamma-aminopropyl)dimethylmorpholine, N-(beta-hydroxyethyl)methylmorpholine, N-(beta-hydroxyethyl)ethylmorpholine, N-(beta-hydroxyethyl)dimethylmorpholine, N-(beta-hydroxypropyl)methylmorpholine, N-(beta-hydroxypropyl)ethylmorpholine, N-(beta-hydroxypropyl)dimethylmorpholine, N-(gamma-hydroxypropyl)methylmorpholine, N-(gamma-hydroxypropyl)ethylmorpholine, N-(gamma-hydroxypropyl)dimethylmorpholine, and the like; piperizine and its derivatives such as N-methylpiperazine, N,N'-dimethylpiperazine, N-ethylpiperazine, N-methyl-N'-ethylpiperazine, N,N'-diethylpiperazine, N-propylpiperazine, N-methyl-N-propylpiperazine, N-ethyl-N'-propylpiperazine, N,N'-dipropylpiperazine, N-(beta-aminoethyl)piperazine, N-methyl-N'-(beta-aminoethyl)piperazine, N-ethyl-N'-(beta-aminoethyl)piperazine, N-propyl-N'-(beta-aminoethyl)piperazine, N,N'-bis(beta-aminoethyl)piperazine, N-(beta-aminopropyl)piperazine, N-methyl-N'-(beta-aminopropyl)piperazine, N-ethyl-N'-(beta-aminopropyl)piperazine, N-propyl-N'-(beta-aminopropyl)piperazine, N-(beta-aminoethyl)-N'-(beta-aminopropyl)piperazine, N,N'-bis(beta-aminopropyl)piperazine, N-(gamma-aminopropyl)piperazine, N-methyl-N'-(gamma-aminopropyl)piperazine, N-ethyl-N'-(gamma-aminopropyl)piperazine, N-propyl-N'-(gamma-aminopropyl)piperazine, N-(beta-aminoethyl)-N'-(gamma-aminopropyl)piperazine, N-(beta-aminopropyl)-N'-(gamma-aminopropyl)piperazine, N,N'-bis(-gamma-aminopropyl)piperazine, N-(beta-hydroxyethyl)piperazine, N-methyl-N'-(beta-hydroxyethyl)piperazine, N-ethyl-N'-(beta-hydroxyethyl)piperazine, N-propyl-N'-(beta-hydroxyethyl)piperazine, N-(beta-aminoethyl)-N'-(beta-hydroxyethyl)piperazine, N-(beta-aminopropyl)-N'-(beta-hydroxyethyl)piperazine, N-(gamma-aminopropyl)-N'-(beta-hydroxyethyl)piperazine, N,N'-bis(beta-hydroxyethyl)piperazine, N-(beta-hydroxypropyl)piperazine, N-methyl-N'-(beta-hydroxypropyl)piperazine, N-ethyl-N'-(beta-hydroxypropyl)piperazine, N-propyl-N'-(beta-hydroxypropyl)piperazine, N-(beta-aminoethyl)-N'-(beta-hydroxypropyl)piperazine, N-(beta-aminopropyl)-N'-(beta-hydroxypropyl)piperazine, N-(gamma-aminopropyl)-N'-(beta-hydroxypropyl)piperazine, N-(beta-hydroxyethyl)-N'-(beta-hydroxypropyl)piperazine, N,N'-bis(beta-hydroxypropyl)piperazine, N-(gamma-hydroxypropyl)piperazine, N-methyl-N'-(gamma-hydroxypropyl)piperazine, N-ethyl-N'-(gamma-hydroxypropyl)piperazine, N-propyl-N'-(gamma-hydroxypropyl)piperazine, N-(beta-aminoethyl)-N'-(gamma-hydroxypropyl)piperazine, N-(beta-aminopropyl)-N'-(gamma-hydroxypropyl)piperazine, N-(gamma-aminopropyl)-N'-(gamma-hydroxypropyl)piperazine, N-(beta-hydroxyethyl)-N'-(gamma-hydroxypropyl)piperazine, N-(beta-hydroxypropyl)-N'-(gamma-hydroxypropyl)piperazine, N,N'-bis(beta-hydroxypropyl)piperazine, methylpiperazine, ethylpiperazine, dimethylpiperazine, N-methylmethylpiperazine, N-methylethylpiperazine, N-methyldimethylpiperazine, N,N'-dimethylmethylpiperazine, N,N'-dimethylethylpiperazine, N,N'-dimethylpropylpiperazine, N-ethylmethylpiperazine, N-ethylethylpiperazine, N-ethyldimethylpiperazine, N-methyl-N'-ethylmethylpiperazine, N-methyl-N'-ethyldimethylpiperazine, N-methyl-N'-ethyldimethylpiperazine, N,N'-diethylmethylpiperazine, N,N'-diethylethylpiperazine, N,N'-diethyldimethylpiperazine, N-propylmethylpiperazine, N-propylethylpiperazine, N-propyldimethylpiperazine, N-methyl-N'-propylmethylpiperazine, N-methyl-N'-propylethylpiperazine, N-methyl-N'-propyldimethylpiperazine, N-ethyl-N'-propylmethylpiperazine, N-ethyl-N'-propylethylpiperazine, N-ethyl-N'-propyldimethylpiperazine, N,N'-dipropylmethylpiperazine, N,N'-dipropylethylpiperazine, N,N'-dipropyldimethylpiperazine, N-(beta-aminoethyl)methylpiperazine, N-(beta-aminoethyl)ethylpiperazine, N-(beta-aminoethyl)dimethylpiperazine, N-methyl-N'-(beta-aminoethyl)methylpiperazine, N-methyl-N'-(beta-aminoethyl)ethylpiperazine, N-methyl-N'-(beta-aminoethyl)dimethylpiperazine, N-ethyl-N'-(beta-aminoethyl)methylpiperazine, N-ethyl-N'-(beta-aminoethyl)ethylpiperazine, N-ethyl-N'-(beta-aminoethyl)dimethylpiperazine, N-propyl-N'-(beta-aminoethyl)methylpiperazine, N-propyl-N'-(beta-aminoethyl)ethylpiperazine, N-propyl-N'-(beta-aminoethyl)dimethylpiperazine, N,N'-bis(beta-aminoethyl)methylpiperazine, N,N'-bis(beta-aminoethyl)ethylpiperazine, N,N'-bis(beta-aminoethyl)dimethylpiperazine, N-(beta-aminopropyl)methylpiperazine, N-(beta-aminopropyl)ethylpiperazine, N-(beta-aminopropyl)dimethylpiperazine, N-methyl-N'-(beta-aminopropyl)methylpiperazine, N-methyl-N'-(beta-aminopropyl)ethylpiperazine, N-methyl-N'-(beta-aminopropyl)dimethylpiperazine, N-ethyl-N'-(beta-aminopropyl)methylpiperazine, N-ethyl-N'-(beta-aminopropyl)ethylpiperazine, N-ethyl-N'-(beta-aminopropyl)dimethylpiperazine, N-propyl-N'-(beta-aminopropyl)methylpiperazine, N-(beta-aminoethyl)-N'-(beta-aminopropyl)methylpiperazine, N-(beta-aminoethyl)-N'-(beta-aminopropyl)ethylpiperazine, N-(beta-aminoethyl)-N'-(beta-aminopropyl)dimethylpiperazine, N,N'-bis(beta-aminopropyl)methylpiperazine, N,N'-bis(beta-aminopropyl)ethylpiperazine, N,N'-bis(beta-aminopropyl)dimethylpiperazine, N-(gamma-aminopropyl)methylpiperazine, N-(gamma-aminopropyl)ethylpiperazine, N-(gamma-aminopropyl)dimethylpiperazine, N-methyl-N'-(gamma-aminopropyl)methylpiperazine, N-methyl-N'-(gamma-aminopropyl)ethylpiperazine, N-methyl-N'-(gamma-aminopropyl)dimethylpiperazine, N-ethyl-N'-(gamma-aminopropyl)methylpiperazine, N-ethyl-N'-(gamma-aminopropyl)ethylpiperazine, N-ethyl-N'-(gamma-aminopropyl)dimethylpiperazine, N-propyl-N'-(gamma-aminopropyl)methylpiperazine, N-propyl-N'-(gamma-aminopropyl)ethylpiperazine, N-propyl-N'-(gamma-aminopropyl)dimethylpiperazine, N-(beta-aminoethyl)-N'-(gamma-aminopropyl)methylpiperazine, N-(beta-aminoethyl)-N'-(gamma-aminopropyl)ethylpiperazine, N-(beta-aminoethyl)-N'-(gamma-aminopropyl)dimethylpiperazine, N-(beta-aminopropyl)-N'-(gamma-aminopropyl)methylpiperazine, N-(beta-aminopropyl)-N'-(gamma-aminopropyl)ethylpiperazine, N-(beta-aminopropyl)-N'-(gamma-aminopropyl)dimethylpiperazine, N,N'-bis(gamma-aminopropyl)methylpiperazine, N,N'-bis(gamma-aminopropyl)ethylpiperazine, N,N'-bis(gamma-aminopropyl)dimethylpiperazine, N-(beta-hydroxyethyl)methylpiperazine, N-(beta-hydroxyethyl)ethylpiperazine, N-(beta-hydroxyethyl)dimethylpiperazine, N-methyl-N'-(beta-hydroxyethyl)methylpiperazine, N-methyl-N'-(beta-hydroxyethyl)ethylpiperazine, N-methyl-N'-(beta-hydroxyethyl)dimethylpiperazine, N-ethyl-N'-(beta-hydroxyethyl)methylpiperazine, N-ethyl-N'-(beta-hydroxyethyl)ethylpiperazine, N-ethyl-N'-(beta-hydroxyethyl)dimethylpiperazine, N-propyl-N'-(beta-hydroxyethyl)methylpiperazine, N-propyl-N'-(beta-hydroxyethyl)ethylpiperazine, N-propyl-N'-(beta-hydroxyethyl)dimethylpiperazine, N-(beta-aminoethyl)-N'-(beta-hydroxyethyl)methylpiperazine, N-(beta-aminoethyl)-N'-(beta-hydroxyethyl)ethylpiperazine, N-(beta-aminoethyl)-N'-(beta-hydroxyethyl)-dimethylpiperazine, N-(beta-aminopropyl)-N'-(beta-hydroxyethyl)methylpiperazine, N-(beta-aminopropyl)-N'-(beta-hydroxyethyl)ethylpiperazine, N-(beta-aminopropyl)-N'-(beta-hydroxyethyl)dimethylpiperazine, N-(gamma-aminopropyl)-N'-(beta-hydroxyethyl)methylpiperazine, N-(gamma-aminopropyl)-N'-(beta-hydroxyethyl)ethylpiperazine, N-(gamma-aminopropyl)-N'-(beta-hydroxyethyl)dimethylpiperazine, N,N'-bis(beta-hydroxyethyl)methylpiperazine, N,N'-bis(beta-hydroxyethyl)ethylpiperazine, N,N'-bis(beta-hydroxyethyl)dimethylpiperazine, N-(beta-hydroxypropyl)methylpiperazine, N-(beta-hydroxypropyl)ethylpiperazine, N-(beta-hydroxypropyl)dimethylpiperazine, N-methyl-N'-(beta-hydroxypropyl)methylpiperazine, N-methyl-N'-(beta-hydroxypropyl)ethylpiperazine, N-methyl-N'-(beta-hydroxypropyl)dimethylpiperazine, N-ethyl-N'-(beta-hydroxypropyl)methylpiperazine, N-ethyl-N'-(beta-hydroxypropyl)ethylpiperazine, N-ethyl-N'-(beta-hydroxypropyl)dimethylpiperazine, N-propyl-N'-(beta-hydroxypropyl)methylpiperazine, N-propyl-N'-(beta-hydroxypropyl)ethylpiperazine, N-propyl-N'-(beta-hydroxypropyl)dimethylpiperazine, N-(beta-aminoethyl)-N'-(beta-hydroxypropyl)methylpiperazine, N-(beta-aminoethyl)-N'-(beta-hydroxypropyl)ethylpiperazine, N-(beta-aminoethyl)-N'-(beta-hydroxypropyl)dimethylpiperazine, N-(beta-aminopropyl)-N'-(beta-hydroxypropyl)methylpiperazine, N-(beta-aminopropyl)-N'-(beta-hydroxypropyl)ethylpiperazine, N-(beta-aminopropyl)-N'-(beta-hydroxypropyl)dimethylpiperazine, N-(gamma-aminopropyl)-N'-(beta-hydroxypropyl)methylpiperazine, N-(gamma-aminopropyl)-N'-(beta-hydroxypropyl)ethylpiperazine, N-(gamma-aminopropyl)-N'-(beta-hydroxypropyl)dimethylpiperazine, N-(beta-hydroxyethyl)-N'-(beta-hydroxypropyl)methylpiperazine, N-(beta-hydroxyethyl)-N'-(beta-hydroxypropyl)ethylpiperazine, N-(beta-hydroxyethyl)-N'-(beta-hydroxypropyl)dimethylpiperazine, N,N'-bis(beta-hydroxypropyl)methylpiperazine, N,N'-(beta-hydroxypropyl)ethylpiperazine, N,N'-bis(beta-hydroxypropyl)dimethylpiperazine, N-(gamma-hydroxypropyl)methylpiperazine, N-(gamma-hydroxypropyl)ethylpiperazine, N-(gamma-hydroxypropyl)-dimethylpiperazine, N-methyl-N'-(gamma-hydroxypropyl)methylpiperazine, N-methyl-N'-(gamma-hydroxypropyl)ethylpiperazine, N-methyl-N'-(gamma-hydroxypropyl)dimethylpiperazine, N-ethyl-N'-(gamma-hydroxypropyl)methylpiperazine, N-ethyl-N'-(gamma-hydroxypropyl)ethylpiperazine, N-ethyl-N'-(gamma-hydroxypropyl)dimethylpiperazine, N-propyl-N'-(gamma-hydroxypropyl)methylpiperazine, N-propyl-N'-(gamma-hydroxypropyl)ethylpiperazine, N-propyl-N'-(gamma-hydroxypropyl)dimethylpiperazine, N-(beta-aminoethyl)-N'-(gamma-hydroxypropyl)methylpiperazine, N-(beta-aminoethyl)-N'-(gamma-hydroxypropyl)ethylpiperazine, N-(beta-aminoethyl)-N'-(gamma-hydroxypropyl)dimethylpiperazine, N-(beta-aminopropyl)-N'-(gamma-hydroxypropyl)methylpiperazine, N-(beta-aminopropyl)-N'-(gamma-hydroxypropyl)ethylpiperazine, N-(beta-aminopropyl)-N'-(gamma-hydroxypropyl)dimethylpiperazine, N-(gamma-aminopropyl)-N'-(gamma-hydroxypropyl)methylpiperazine, N-(gamma-aminopropyl)-N'-(gamma-hydroxypropyl)ethylpiperazine, N-(gamma-aminopropyl)-N'-(gamma-hydroxypropyl)dimethylpiperazine, N-(beta-hydroxyethyl)-N'-(gamma-hydroxypropyl)methylpiperazine, N-(beta-hydroxyethyl)-N'-(gamma-hydroxypropyl)ethylpiperazine, N-(beta-hydroxyethyl)-N'-(gamma-hydroxypropyl)dimethylpiperazine, N,N'-bis(gamma-hydroxypropyl)methylpiperazine, N,N'-bis(gamma-hydroxypropyl)ethylpiperazine, N,N'-bis(gamma-hydroxypropyl)dimethylpiperazine, and mixtures thereof.

The diamines are compounds of the following general formula (V)

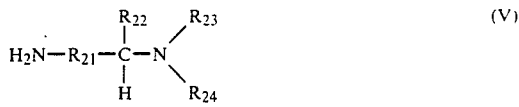

In the formula, $R_{21}$ represents a divalent hydrocarbon group having from 1 to 45 carbon atoms, preferably from 1 to 24 carbon atoms, more preferably from 1 to 12 carbon atoms, $R_{22}$, $R_{23}$ and $R_{24}$ may be the same or different and represent a hydrogen atom or an alkyl group having from 1 to 45 carbon atoms, preferably from 1 to 24 carbon atoms and most preferably from 1 to 8 carbon atoms. Alternatively, $R_{21}$ and $R_{22}$ may join to form a five to seven-membered, preferably six-membered, saturated aliphatic ring in which from 1 to 3 hydrogen atoms, preferably 1 or 2 hydrogen atoms may be replaced by an alkyl group having from 1 to 6 carbon atoms, preferably from 1 to 4 carbon atoms.

Preferable examples of the divalent hydrocarbon group represented by

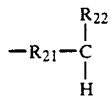

in the formula (V) include an ethylene group, a propylene group, an ethylethylene group, a propylethylene group, a butylethylene group, a pentylethylene group, a hexylethylene group, a heptylethylene group, an octylethylene group, a trimethylene group, a methyltrimethylene group, an ethyltrimethylene group, a propyltrimethylene group, a butyltrimethylene group, a pentyltrimethylene group, a hexyltrimethylene group, a heptyltrimethylene group, an octyltrimethylene group, a tetramethylene group, a methyltetramethylene group, an ethyltetramethylene group, a propyltetramethylene group, a butyltetramethylene group, a pentyltetramethylene group, a hexyltetramethylene group, a heptyltetramethylene group, an octyltetramethylene group, a pentamethylene group, a methylpentamethylene group, an ethylpentamethylene group, a propylpentamethylene group, a butylpentamethylene group, a pentylpentamethylene group, a hexylpentamethylene group, a heptylpentamethylene group, an octylpentamethylene group, a hexamethylene group, a methylhexamethylene group, an ethylhexamethylene group, a propylhexamethylene group, a butylhexamethylene group, a pentylhexamethylene group, a hexylhexamethylene group, a heptylhexamethylene group, an octylhexamethylene group, a heptamethylene group, a methylheptamethylene group, an ethylheptamethylene group, a propylheptamethylene group, a butylheptamethylene group, a pentylheptamethylene group, a hexylheptamethylene group, a heptylheptamethylene group, an octylheptamethylene group, an octamethylene group, a methyloctamethylene group, an ethyloctamethylene group, a propyloctamethylene group, a butyloctamethylene group, a pentyloctamethylene group, a hexyloctamethylene group, a heptyloctamethylene group, an octyloctamethylene group, a nonamethylene group, a methylnonamethylene group, an ethylnonamethylene group, a propylnonamethylene group, a butylnonamethylene group, a pentylnonamethylene group, a hexylnonamethylene group, a heptylnonamethylene group, an octylnonamethylene group, a decamethylene group, a methyldecamethylene group, an ethyldecamethylene group, a propyldecamethylene group, a butyldecamethylene group, a pentyldecamethylene group, a hexyldecamethylene group, a heptyldecamethylene group, an octyldecamethylene group, a cyclopentylene group, a methylcyclopentylene group, an ethylcyclopentylene group, a propylcyclopentylene group, a butylcyclopentylene group, a dimethylcyclopentylene group, a diethylcyclopentylene group, a cyclohexylene group, a methylcyclohexylene group, an ethylcyclohexylene group, a propylcyclohexylene group, a butylcyclohexylene group, a dimethylcyclohexylene group, a diethylcyclohexylene group, a cycloheptylene group, a methylcycloheptylene group, an ethylcycloheptylene group, a propylcycloheptylene group, a butylcycloheptylene group, a dimethylcycloheptylene group, a diethylcycloheptylene group, and groups of the following general formulae

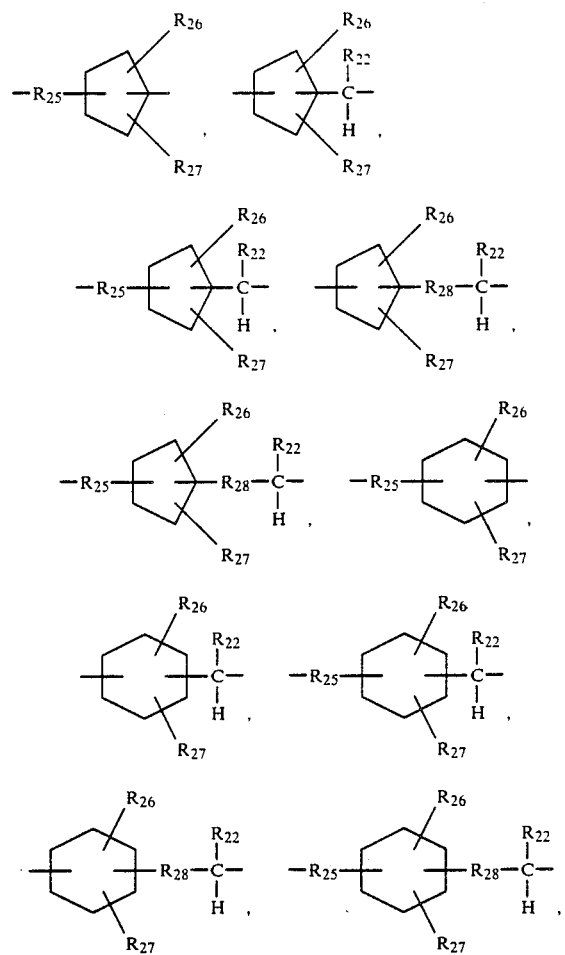

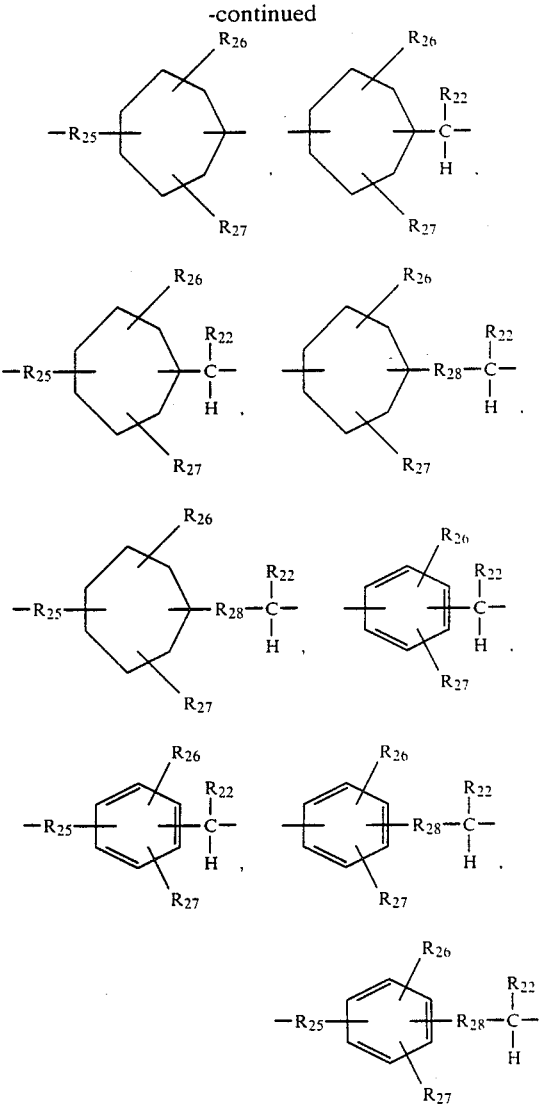

in which each $R_{22}$ is the same group as $R_{22}$ in the formula (V), each $R_{25}$ represents an alkylene group having from 1 to 5 carbon atoms, each $R_{26}$ and each $R_{27}$ may be the same or different and represent a hydrogen atom or an alkyl group having from 1 to 6 carbon atoms, preferably from 1 to 3 carbon atoms, and each $R_{28}$ represents an alkylene group having from 1 to 4 carbon atoms.

Preferable groups for $R_{22}$, $R_{23}$ and $R_{24}$ in the formula (V) include a hydrogen atom, a methyl group, an ethyl group, a propyl group, a butyl group, a pentyl group, a hexyl group, a heptyl group, an octyl group and the like.

In view of the high radical telomerization reactivity, diamines of the general formula (V) in which if $R_{21}$ and $R_{22}$ do not form a ring, at least $R_{22}$ and $R_{23}$ are, respectively, a hydrogen atom or if $R_{21}$ and $R_{22}$ form a ring in combination, at least $R_{23}$ is a hydrogen atom are preferred.

The polyamines indicated before mean compounds of the general formula (VI)

$$H_2N-(R_{29}-NH)_nH \quad (VI)$$

in which $R_{29}$ represents an ethylene group, a propylene group or a trimethylene group, and n is an integer of from 2 to 11.

Preferable polyamines of the general formula (VI) include, for example, diethylenetriamine, triethylenetetramine, tetraethylenepentamine, pentaethylenehexamine, hexaethyleneheptamine, heptaethyleneoctamine, octaethylenenonamine, nonaethylenedecamine, decaethyleneundecamine, undecaethylenedodecamine, dipropylenetriamine, tripropylenetetramine, tetrapropylenepentamine, pentapropylenehexamine, hexapropyleneheptamine, heptapropyleneoctamine, octapropylenenonamine, nonapropylenedecamine, decapropyleneundecamine, undecapropylenedodecamine, di(trimethylene)triamine, tri(trimethylene)tetramine, tetra(trimethylene)pentamine, penta(trimethylene)hexamine, hexa(trimethylene)heptamine, hepta(trimethylene)octamine, octa(trimethylene)nonamine, nona(trimethylene)decamine, deca(trimethylene)undecamine, undeca(trimethylene)dodecamine and mixtures thereof.

The nitrogen-containing compound portion which are used as one ingredient in the practice of the invention and serve as a telogen are preferably, as described hereinabove, alkylamines, cycloalkylamines, alkanolamines, cycloalkanolamines, heterocyclic amines, diamines, polyamines and mixtures thereof. In view of the high reactivity with alpha-olefins used as a taxogen which is the other ingredient, the formation of oil-soluble nitrogen-containing compounds of a higher molecular weight by the radical telomerization reaction, the good properties of the oil-soluble nitrogen-containing products as additives for fuel oils and lubricating oils, and the high reaction with a boron compound, alkanolamines, cycloalkanolamines, heterocyclic amines, diamines, polyamines and mixtures thereof are more preferred. Of these, the most preferable amines are heterocyclic amines, diamines and polyamines which have two or more nitrogen atoms and at least two nitrogen atoms are kept spaced from each other through an alkylene group having 3 or more carbon atoms, i.e. a structure of the following formula

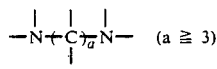   (a ≧ 3)

These amines may be used singly or in combination.

The taxogen which is the second ingredient used in the process of the invention is an alpha-olefin of the general formula (VII),

   (VII)

in which $R_5$ represents an alkyl group having from 1 to 28 carbon atoms, preferably from 1 to 18 carbon atoms.

Preferable alpha-olefins for the second ingredient of the invention include, for example, ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, and mixtures thereof.

In the practice of the invention, 1 mole of (1) telogens or nitrogen-containing ingredients is reacted with 0.1 to 20 moles, preferably from 0.3 to 10 moles and most preferably from 0.5 to 5 moles of (2) taxogens or alpha-olefins under radical-generating conditions. As a result, oil-soluble nitrogen-containing products are formed as a main telomer product by the radical telomerization. The products have a high molecular weight hydrocarbon substituent on the carbon atom at the alpha position of the nitrogen atom. If the ingredient (2) is added in an amount of less than 0.1 mole per mole of the ingredient (1), a 1:1 addition product of the ingredients (1) and (2) is formed in large amounts. On the other hand, when the amount of the ingredient (2) used exceeds 20 moles, a homopolymer of the alpha-olefin of the ingredient (2) which is free of the ingredient (1) is unfavorably formed in large amounts.

The radical-generating conditions used herein are intended to mean conditions where (1) a radical initiator is used, (2) actinic light having a wavelength of not larger than 300 nm, and (3) a radical initiator and the actinic light are used in combination. Examples of the radical initiator include peroxides such as di-t-butyl peroxide, dicumyl peroxide, t-butylcumyl peroxide, benzoyl peroxide, lauroyl peroxide, t-butyl hydroperoxide, cumene hydroperoxide, hydrogen peroxide and the like, and azo compounds such as azobisisobutyronitrile. The actinic light may be UV light from a high pressure mercury lamp. Preferably, the radicals are generated by the use of peroxides, of which di-t-butyl peroxide or dicumyl peroxide is more preferred. This is because the hydrogen withdrawal reaction from nitrogen-containing compounds (1) which is an initiation reaction for the telomerization is more likely to occur and the generation of the radicals is not prevented by the coloration of a reaction mixture. When a radical initiator is used for the radical generation, its concentration is generally in the range of from 0.005 to 0.3 moles per mole of an alpha-olefin of the ingredient (2). If the amount of the radical initiator used is below the above range, the comparsion and degree of polymerization of the alpha-olefin will lower. On the other hand, over the above range, no additional effect can be expected.

The reaction temperature, time and manner of reaction for the radical telomerization reaction are not critical but the reaction is preferably effected as follows.

The entire amount of a nitrogen-containing ingredient used as a telogen (1) and the entire amount or part of an alpha-olefin used as a taxogen (2) are placed in a reaction vessel. The temperature in the reactor is set at 50° to 200° C. Subsequently, a peroxide used as a radical initiator is gradually added as it is or in the form of a solution in an alpha-olefin in 1 hour or longer, preferably in 2 to 4 hours. At this stage, the temperature in the reactor should preferably be maintained at 50° to 200° C. so that the peroxide has a primary decomposition half-life period of several to several tens minutes. For instance, when di-t-butyl peroxide is used as the radical initiator, it is necessary that the temperature in the reactor be set at about 165° C. or higher so that the primary decomposition half-life period is about 10 minutes. After completion of the addition of the radical initiator, the radical telomerization reaction is still continued for 1 to 2 hours while keeping the reactor at said temperature. In this manner, the radical initiator can be effectively utilized to obtain an intended oil-soluble nitrogen-containing product in a high yield.

The process of the invention does not require any complicated reaction apparatus and can be carried out using the procedure described above. In this connection, however, when the nitrogen-containing ingredients (1) and alpha-olefins (2) used are gaseous under normal temperature and normal pressure conditions or they are liquid at normal temperatures and pressures but become gaseous at reaction temperatures, an autoclave provided with an agitator should preferably be used for the reaction in a closed system. On the other hand, when nitrogen-containing ingredients (1) and alpha-olefins (2) are liquid at reaction temperatures, the reaction should preferably be conducted in an ordinary reactor in a stream of nitrogen at normal pressures.

In this manner, there is obtained a reaction mixture which is composed mainly of an oil-soluble nitrogen-containing compound. The reaction mixture is subjected to removal of the unreacted nitrogen-containing ingredient and alpha-olefin as well as low molecular weight reaction products, thus obtaining an intended oil-soluble nitrogen-containing compound. A method for separating the oil-soluble nitrogen-containing compound from the reaction mixture is not critically limited but is preferably performed by the following manner.

After completion of the reaction, the reactor is cooled down to room temperature. If the alpha-olefin (2) used is gaseous, the system is opened to allow the unreacted alpha-olefin to release. Thereafter, 0.5 to 10 parts by weight of an organic solvent having a boiling point of 40° C. to 150° C., e.g. benzene, toluene, xylene, hexene, benzine, gasoline for rubber, gasoline for extraction, petroleum ether or the like, is added, if necessary, to 1 part by weight of the reaction mixture. To the mixture is added 0.5 to 40 parts by weight, based on 1 part by weight of the reaction mixture, of a 1 to 50 wt. % aqueous solution of an alcohol such as methanol or ethanol. If the organic solvent is not used in the preceding step, an alcohol or an aqueous alcohol solution in any concentration may be used for the extraction. The extraction procedure may be repeated two or three times, if necessary. The unreacted nitrogen-containing ingredient (1) and low molecular weight reaction products are removed by the extraction. When the alpha-olefin (2) used is liquid, the unreacted alpha-olefin is removed from the organic phase. In addition, if the organic solvent is used, it is also distilled off to obtain an intended oil-soluble nitrogen-containing compound.

Alternatively, the reaction mixture is first subjected to distillation to remove the unreacted nitrogen-containing ingredient (1) and unreacted alpha-olefin (2) when it is liquid. If necessary, the reaction mixture is diluted with such an organic solvent as mentioned before and then incorporated with an aqueous alcohol solution to remove low molecular weight reaction products by extraction. If an organic solvent has been used, the organic solvent is further removed from the organic phase to obtain an intended oil-soluble nitrogen-containing compound.

According to the above procedure, if low molecular weight reaction products are formed only in small amounts, the dilution with an organic solvent and the extraction with an aqueous alcohol solution may be omitted, so that an oil-soluble nitrogen-containing compound can be obtained only by distillation to remove the unreacted ingredients.

The thus obtained oil-soluble nitrogen-containing product may contain aliphatic unsaturated bonds formed during the reaction process. If necessary, the product may be further purified by hydrogenation.

The oil-soluble nitrogen-containing product obtained according to the process of the invention is generally composed chiefly of a mixture of telomers of the following general formula (VIII)

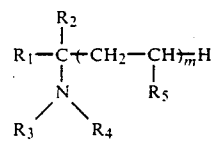

(VIII)

and/or

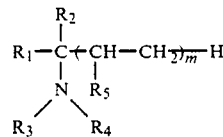

in which $R_1$, $R_2$, $R_3$ and $R_4$ are as defined in the formula (I), $R_5$ is a group as defined in the formula (VII), and m is an integer not smaller than 1, preferably from 2 to 30.

The value of m which indicates an average degree of polymerization of an alpha-olefin in the formula (VIII) can be arbitrarily varied by changing the ratio of a nitrogen-containing ingredient (1) and an alpha-olefin (2) within a range of 1:0.1 to 20 by mole.

The oil-soluble nitrogen-containing product of the formula (VIII) obtained according to the invention should have an average molecular weight of not less than 300, preferably from 400 to 3,000 and a nitrogen content of from 0.1 to 10 wt %. If the average molecular weight is less than 300 and the nitrogen content is less than 0.1 wt %, the properties of the product which is expected to have main utility as an additive for fuel oils and lubricating oils become poor. On the contrary, when the nitrogen content exceeds 10 wt %, the nitrogen-containing product becomes so high in polarity that its oil solubility is undesirably reduced or even lost.

As will be appreciated from the formula (VIII), the oil-soluble nitrogen-containing compound of the present invention is a compound which consists of a polymer of an alpha-olefin used as taxogen (2) joined to the carbon atom at the alpha position of the nitrogen atom of a nitrogen-containing ingredient used as telogen (1). In general, the product compound is obtained in the form of a mixture of oil-soluble nitrogen-containing compounds which have respective different degrees of polymerization of an alpha-olefin used and respective different positions of $R_5$ in the alpha-olefin polymer. Especially, if there exist two or more carbon atoms having at least one hydrogen atom in a nitrogen-containing ingredient, as a telogen (1), at the alpha position of the nitrogen atom, the alpha-olefin can join all the carbon atoms during the course of the radical telomerization, permitting a larger number of telomer compounds to be formed.

The oil-soluble nitrogen-containing product obtained by the process of the invention has a hydrocarbon group of a high molecular weight sufficient for oil solubility and basic nitrogen atoms serving as polar groups. Thus, the product has good detergency, dispersability, corrosion resistance, rust-preventing property and friction reducibility. Accordingly, the product can be used as an additive for fuel oils and lubricating oils after dilution with suitable solvents. Since conventional amine detergent-dispersants considerably lower water separability or demulsibility of lubricating oil, it has been impossible to add them to industrial lubricating oils in large amounts. However, the oil-soluble, nitrogen-containing products of the present invention will not lower the water separability of lubricating oils when added even in amounts not less than 1 wt %. Thus, they are very useful as a detergent-dispersant, a rust preventive or a friction reducing agent for industrial lubricating oils which require high water separability.

Moreover, when alpha-olefins having a large number of carbon atoms are used as the taxogen, the resulting products have a better rust-preventing property and friction reducibility than known detergent-dispersants such as alkenylsuccinimides having a polybutene oleophilic group.

The reaction products obtained above may be further reacted with boron-bearing compounds or boron compound in order to impart better properties to the products as mentioned before.

For the following reaction, although the reaction mixture obtained by the radical telomerization reaction may be used as it is, it is preferred that the unreacted nitrogen-containing ingredients or telogens, unreacted alpha-olefins or taxogens and low molecular weight products be removed from the reaction mixture prior to being subjected to boration.

The boron compounds useful in the practice of the invention may be all boron compounds which are capable of forming oil-soluble nitrogen and boron-containing compounds by reaction with the oil-soluble nitrogen-containing reaction product. Specific examples of the boron compound include boron acids such as orthoboric acid ($H_3BO_3$), metaboric acid ($HBO_2$) and tetraboric acid ($H_2B_4O_7$), boron oxides such as boron oxide ($B_2O_3$), boron halides such as boron fluoride, boron chloride and boron bromide, borates such as ammonium borate, sodium borate and potassium borate, and lower alkyl esters of boron acid which have the following general formula $$(R_{30}O)xB(OH)y$$

in which $R_{30}$ represents an alkyl group having from 1 to 6 carbon atoms, x is an integer of from 1 to 3, and y is an integer of from 0 to 2 provided that $x+y=3$. Specific examples of the lower alkyl esters include mono, di and trimethyl borate, mono, di and triethyl borate, mono, di and tripropyl borate, mono, di and tributyl borate, mono, di and tripentyl borate, mono, di and trihexyl borate, and mixtures thereof. Of these compounds, boron acids and the lower alkyl esters of boron acids are preferred. Most preferably, orthoboric acid, the lower alkyl esters and the mixtures thereof are used.

The boron compound should be used in amounts sufficient to give a boron content of from 0.05 to 7.0 wt % in the resulting oil-soluble nitrogen and boron-containing product. In general, the boron compound is used in such an amount that from 0.05 to 10, preferably from 0.1 to 2, boron atoms in a boron compound react with one nitrogen atom in an oil-soluble nitrogen-containing product.

The boration process is effected by heating an oil-soluble nitrogen-containing product along with a boron compound. If necessary, the boration may be effected in water, an alcohol, a hydrocarbon or a mixture thereof. Water and/or an alcohol reacts with a boron compound to form an intermediate reactant which favors the boration and is thus used as a "reactive solvent". Such a reactive solvent can improve the boration with the resultant improved yield of a desired product. On the other hand, hydrocarbons are used as a "non-reactive solvent" and function not only as a solvent for the boration, but also to eliminate water formed by the reaction from the system by azeotropy.

Examples of the alcohol include methanol, ethanol, propanol, isopropanol, n-butanol, sec-butanol, pentanol (amyl alcohol and isoamyl alcohol), hexanol, ethylene glycol, propylene glycol, butylene glycol, pentylene glycol and hexylene glycol. Examples of the hydrocarbon include benzene, xylene, naphtha, cyclohexane, hexane and mineral oil.

The reaction temperature should be so high as to cause a boron compound to react with an oil-soluble nitrogen-containing product, but should not be so high that the resulting product decomposes. The reaction temperature is generally in the range of from 50° to 250° C., preferably from 80° to 180° C. The boration generally completes within a short time and the reaction time is generally within a range of from 0.5 to 8 hours, preferably from 2 to 6 hours.

After completion of the boration, the reaction mixture is heated to distill off the water formed by the reaction and a solvent if such a solvent has been used for the reaction. Subsequently, the reaction mixture is diluted, if necessary, with an organic solvent such as benzene, toluene, xylene, hexane, benzine, gasoline for rubber, gasoline for extraction or petroleum ether. The unreacted boron compound and part of the borated reaction product which is not soluble in oils are removed by filtration or extraction with a solvent, thereby obtaining a purified oil-soluble nitrogen and boron-containing product.

The oil-soluble nitrogen and boron-containing compound is composed mainly of a mixture of telomers of the afore-indicated formula (VIII) in which the boron atoms or boron compound is coordinated at the nitrogen atoms of the telomers. If an amine having a hydroxyl group such as an alkanolamine or a cycloalkanolamine is used as the telogen and boron acid is used as the boron compound, the resulting boron ester is also contained in the nitrogen and boron-containing product.

The ratio in number of the nitrogen atoms to the boron atoms in the oil-soluble nitrogen and boron-containing product may be arbitrarily varied, within the afore-defined range, by changing the amount of a boron compound used with respect to the oil-soluble nitrogen-containing product obtained in said one aspect of the invention. In general, the ratio in number of the nitrogen atoms to the boron atoms in the final product is in the range of 1:0.05 to 5, preferably 1:0.1 to 2.

The oil-soluble nitrogen and boron-containing product obtained according to the process of the invention should have an average molecular weight of not less than 300, preferably from 400 to 3,000, a nitrogen content of from 0.1 to 10 wt % and a boron content of from 0.05 to 7 wt %. In cases where the average molecular weight is less than 300, the nitrogen content is less than 0.1 wt % or the boron content is less than 0.05 wt % in a nitrogen and boron-containing product, it will exhibit poor properties for use as an additive for fuel oils or lubricating oils although this use is considered to be one of main applications of the product. On the other hand, in cases where the nitrogen content exceeds 10 wt % or the boron content exceeds 7.0 wt % in a product, the product has so high a polarity that its oil solubility is undesirably lost.

Aside from the properties inherent to the nitrogen-containing product, the nitrogen and boron-containing product has additional and improved properties such as good oxidation resistance, good abrasion resistance and good extreme pressure lubrication because of the presence of the high molecular weight hydrocarbon group, the basic nitrogen atoms and the boron atoms coordinated at the nitrogen atoms in the product. Thus, the latter product itself or in the solvent dilution form is also effectively used as an additive for fuel oils and lubricating oils.

Similar to the oil-soluble nitrogen-containing product in one aspect of the invention, the nitrogen and boron-containing product in the other aspect can be added in amounts not less than 1 wt % without lowering demulsibility of lubricating oils. Thus, the nitrogen and boron-containing product is more useful as a detergent-dispersant, a rust preventive, a friction reducing agent and the like for industrial lubricating oils. The nitrogen and boron-containing product of the invention has better properties such as rust preventiveness, friction reducibility and wear preventiveness, than conventional nitrogen-containing products such as succinimide detergent-dispersants having a polybutene oleophilic group.

The present invention is more particularly described by way of examples which should not be construed as limiting the present invention thereto.

In the examples, a number of purification methods are used for oil-soluble nitrogen-containing products and oil-soluble nitrogen and boron-containing products. Purification methods (1) through (4) are for the nitrogen-containing products and purification methods (5) through (8) are for the nitrogen and boron-containing products. These methods are as follows.

Purification method (1): A reaction mixture obtained from a nitrogen-containing ingredient (telogen) and an alpha-olefin (taxogen) was diluted with an organic solvent and extracted with an aqueous alcohol solution to remove the unreacted nitrogen-containing ingredient and low molecular weight reaction products from the mixture; and the organic phase was distilled to remove the unreacted alpha-olefin and the organic solvent, thereby obtaining an intended oil-soluble nitrogen-containing product.

Purification method (2): A reaction mixture similar to the above was distilled to remove the unreacted nitrogen-containing ingredient and alpha-olefin from the mixture, diluted with an organic solvent and then incorporated with an aqueous alcohol solution in order to remove the low molecular weight reaction products by extraction whereupon the resulting organic phase was subjected to removal of the organic solvent, thereby obtaining an intended oil-soluble nitrogen-containing product.

Purification method (3): The purification method (2) was repeated except that the dilution with an organic solvent was omitted.

Purification method (4): The purification method (3) was repeated except that the dilution with an organic solvent and the extraction with an aqueous alcohol solution were omitted.

Purification method (5): A borated reaction product in which the original reaction mixture had been similar to the above, was diluted with an organic solvent and filtered to remove the unreacted boron compound and reaction products insoluble in the organic solvent from the product; and the resultant organic phase was subjected to removal of the organic solvent, thereby obtaining an oil-soluble nitrogen and boron-containing product.

Purification method (6): A borated reaction product similar to the above was diluted with an organic solvent and then incorporated with an aqueous alcohol solution to remove by extraction the unreacted boron compound and low molecular weight reaction products, thereby obtaining an intended oil-soluble nitrogen and boron-containing product.

Purification methods (7) and (8): The purification methods (5) and (6) were, respectively, repeated except that the dilution with an organic solvent was omitted.

EXAMPLE 1

500 parts by weight of N,N'-bis(gamma-aminopropyl)-piperazine as a telogen and 1000 parts by weight of 1-octadecene as a taxogen were weighed out, charged into a four-necked flask and heated to 165° C. while agitating in an atmosphere of nitrogen. The whole so heated was incorporated with a mixture of 260 parts by weight of 1-octadecene and 146 parts by weight of di-t-butyl peroxide (DTBP) as a radical initiator by dropping the mixture portion by portion thereto in 2 hours, followed by agitation for 2 hours while keeping the above temperature to conduct radical telomerization of the 1-octadecene using the N,N'-bis(gamma-aminopropyl)piperazine as the telogen. The molar ratio of the taxogen to the telogen was 2.0 and the molar ratio of the radical initiator to the taxogen was 0.2.

After completion of the reaction, the reaction mixture was purified according to the purification method (1), i.e. 2000 parts by weight of benzene was added to the mixture, to which 3,500 parts by weight of an aqueous 10 wt % solution of methanol was further added in order to remove the unreacted N,N'-bis(gamma-aminopropyl)piperazine and low molecular weight reaction products by extraction. Thereafter, the benzene and unreacted 1-octadecene were removed from the benzene phase to obtain 800 parts by weight of an intended product which was a mixture of oil-soluble nitrogen-containing compounds.

The product had an average molecular weight of 970 and a nitrogen content of 5.1 wt %. The conversion of the 1-octadecene was 52% with a number average degree of polymerization of 3.2.

EXAMPLE 2

328 parts by weight of di(trimethylene)triamine as a telogen and 900 parts by weight of a mixed alpha-olefin of 1-hexadecene and 1-octadecene as a taxogen (mixing ratio by weight of 57:43) were weighed and charged into a four neck distillation flask and heated up to 165° C. while agitating in an atmosphere of nitrogen. A mixture of 280 parts by weight of the mixed alpha-olefin and 146 parts by weight of DTBP as a radical initiator was dropped portion by portion in 2 hours, followed by agitation for 2 hours while keeping the above temperature to conduct radical telomerization of the mixed alpha-olefin using the di(trimethylene)triamine as the telogen. The molar ratio between the taxogen and the telogen was 2.0 and the molar ratio between the radical initiator and the taxogen was 0.2.

After completion of the reaction, the reaction mixture was purified according to the purification method (4), i.e. the reaction mixture was subjected to distillation to remove the unreacted di(trimethylene)triamine and the mixed alpha-olefin, thereby obtaining 845 parts by weight of an intended product which was a mixture of oil-soluble nitrogen-containing compounds.

The product had an average molecular weight of 930 and a nitrogen content of 3.8 wt %. The conversion of the alpha-olefin was 63% with a number average degree of polymerization of 3.2.

EXAMPLES 3–13

Telogens (nitrogen-containing ingredients), taxogens (alpha-olefins) and radical initiators indicated in Table 1 were used and subjected to radical telomerization of the taxogens with the telogens respectively in the same manner as in Examples 1 and 2 using conditions indicated in Table 1.

After completion of the reaction, each reaction mixture was purified according to the purification method indicated in Table 1 to obtain an intended oil-soluble nitrogen-containing compound. The average molecular weight and the nitrogen content of each product so obtained, the conversion of the respective taxogens, and the number average degree of polymerization are shown in Table 2.

TABLE 1

| Example | (1) Nitrogen-containing compound (telogen) | (2) Alpha-olefin (Taxogen) | Radical initiator | Taxogen/telogen (molar ratio) |
|---|---|---|---|---|
| Example 3 | butylamine [730] | 1-tetradecene [700] [280] | DTBP [73] | 0.5 |
| Example 4 | cyclohexylamine [495] | 1-decene [200] [150] | DTBP [73] | 0.5 |
| Example 5 | diethanolamine [525] | 1-dodecene [600] [240] | DTBP [73] | 1.0 |
| Example 6 | cyclohexanolamine [575] | 1-dodecene + 1-tetradecene*1 [200] [150] | DTBP [73] | 1.0 |
| Example 7 | N-(beta-hydroxyethyl)-morpholine [655] | 1-decene [200] [150] | DTBP [73] | 0.5 |
| Example 8 | N-(gamma-aminopropyl)-morpholine [360] | 1-dodecene + 1-tetradecene*1 [605] [300] | DTBP [146] | 2.0 |
| Example 9 | N-(beta-aminoethyl)piperazine [645] | 1-decene [500] [200] | DTBP [146] | 0.5 |
| Example 10 | N,N'-bis(gamma-aminopropyl)-piperazine [1000] | 1-decene [500] [200] | DTBP [146] | 1.0 |

| Example | Radical Initiator/taxogen molar ratio | Reaction temperature (°C.) | Dropping time of radical initiator + taxogen (hours) | Reaction time (hours) |
|---|---|---|---|---|
| Example 3 | 0.1 | 150 | 2.0 | 2.0 |
| Example 4 | 0.2 | 150 | 2.0 | 2.0 |
| Example 5 | 0.1 | 165 | 2.0 | 2.0 |
| Example 6 | 0.2 | 165 | 2.0 | 2.0 |
| Example 7 | 0.2 | 150 | 2.0 | 2.0 |
| Example 8 | 0.2 | 165 | 2.0 | 2.0 |
| Example 9 | 0.2 | 150 | 2.0 | 2.0 |
| Example 10 | 0.2 | 165 | 2.0 | 2.0 |

| Example | Purification method | Organic solvent | Aqueous alcohol solution (wt %) | Yield of N-containing product |
|---|---|---|---|---|
| Example 3 | (4) | — | — | [591] |
| Example 4 | (3) | — | methanol (100) [1,000] | [147] |
| Example 5 | (1) | hexane [2,000] | methanol (20) [3,000] | [343] |
| Example 6 | (2) | hexane [1,000] | methanol (20) [2,500] | [422] |
| Example 7 | (1) | hexane [1,000] | methanol (20) [2,000] | [137] |
| Example 8 | (4) | — | — | [159] |
| Example 9 | (1) | hexane [2,000] | methanol (20) [3,000] | [159] |
| Example 10 | (1) | hexane [2,000] | methanol (20) [3,000] | [280] |

TABLE 1-continued

| Example | (1) Nitrogen-containing compound (telogen) | (2) Alpha-olefin (taxogen) | Radical initiator | Taxogen/telogen (molar ratio) |
|---|---|---|---|---|
| Example 11 | hexamethylene-diamine [580] | 1-hexadecene + 1-octadecene*2 [900] [280] | DTBP [146] | 1.0 |
| Example 12 | diethylene-triamine [258] | 1-dodecene + 1-tetradecene*1 [605] [300] | DTBP [146] | 2.0 |
| Example 13 | di(trimethylene)-triamine [197] | 1-decene + 1-dodecene + 1-tetradecene*3 [780] [220] | DTBP [175] | 4.0 |

*1: 1-dodecene:1-tetradecene = 56:44 (ratio by weight)
*2: 1-hexadecene:1-octadecene = 57:43 (ratio by weight)
*3: 1-decene:1-dodecene:1-tetradecene = 28:40:32 (ratio by weight)

| Example | Radical Initiator/taxogen molar ratio | Reaction temperature (°C.) | Dropping time of radical initiator + taxogen (hours) | Reaction time (hours) |
|---|---|---|---|---|
| Example 11 | 0.2 | 165 | 2.0 | 2.0 |
| Example 12 | 0.2 | 165 | 2.0 | 2.0 |
| Example 13 | 0.2 | 165 | 2.0 | 2.0 |

| Example | Purification method | Organic solvent | Aqueous alcohol solution (wt %) | Yield of N-containing product |
|---|---|---|---|---|
| Example 11 | (1) | benzene [1,000] | methanol (20) [2,500] | [657] |
| Example 12 | (3) | — | methanol (100) [1,000] | [171] |
| Example 13 | (1) | benzene [1,000] | methanol (20) [2,500] | [613] |

TABLE 2

| Example | Average Molecular weight | Nitrogen Content (wt %) | Conversion of Alpha-olefin (%) | Number Average Degree of Polymerization of Alpha-olefin |
|---|---|---|---|---|
| 3 | 750 | 1.9 | 56 | 3.5 |
| 4 | 670 | 2.1 | 37 | 4.2 |
| 5 | 740 | 1.9 | 36 | 3.9 |
| 6 | 760 | 1.8 | 41 | 3.7 |
| 7 | 590 | 3.5 | 26 | 2.8 |
| 8 | 790 | 3.9 | 58 | 3.5 |
| 9 | 500 | 7.9 | 17 | 2.7 |
| 10 | 710 | 6.7 | 30 | 3.9 |

TABLE 2-continued

| Example | Average Molecular weight | Nitrogen Content (wt %) | Conversion of Alpha-olefin (%) | Number Average Degree of Polymerization of Alpha-olefin |
|---|---|---|---|---|
| 11 | 970 | 2.9 | 50 | 3.7 |
| 12 | 710 | 4.1 | 17 | 3.5 |
| 13 | 790 | 4.1 | 53 | 4.1 |

EXAMPLES 14–17 AND COMPARATIVE EXAMPLES 1–3

In order to assess the properties, as an additive for lubricating oil, of the oil-soluble nitrogen-containing products obtained according to the invention, the products obtained in Examples 1 and 2 were subjected to the following assessment tests. The results are shown in Table 3.

For comparison, a refined mineral oil itself, polybutenylsuccinimide (which was obtained by reacting polybutene and maleic acid to obtain polybutenylsuccinic acid and further reacting the acid with an alkylene polyamine and which had a nitrogen content of 4.8 wt %), and polybutenylamine (which was obtained by chlorinating polybutene and subjecting to dehydrochlorination with an alkylenepolyamine and which had a nitrogen content of 1.0 wt %). These results are also shown in Table 3.

(1) Sludge dispersion and solubilization test

A mineral oil having a kinetic viscosity of 45 cst (40° C.) was deteriorated by oxidation for 200 hours using a copper catalyst according to the lubricating oil oxidation stability test method prescribed in JIS K 2514. Thereafter, the deteriorated oil was filtered and the filtrate was dehydrated to give a sludge stock solution. The sludge stock solution had a whole acid value of 30 mg KOH/g, a copper content of 0.17 wt % and a content of an n-hexane insoluble matter of 3.8 wt %.

Each oil-soluble nitrogen-containing product was charged into a 10 ml test tube with a stopper in an amount indicated in Table 3 and 10 ml of an n-hexane solution dissolving the product was taken, to which the sludge stock solution was added stepwise each by 10 microliters by the use of a microsyringe to determine an amount of the sludge stock solution which the n-hexane solution was able to dissolve therein.

In the following performance assessment tests (2) through (4), an oil-soluble nitrogen-containing product was added to a refined mineral oil having a kinetic viscosity of 56 cst at 40° C. and a viscosity index of 102 in an amount indicated in Table 3 and the resulting composition was tested.

(2) Demulsibility test

Measured at a test temperature of 54° C. according to a lubricating oil demulsibility test prescribed in JIS K 2520.

(3) Rust-preventing performance test

Measured for a test time of 24 hours using distilled water according to a lubricating oil rust-preventing performance test prescribed in JIS K 2510.

(4) Friction reducing performance test

A coefficient of friction was measured at an oil temperature of 60° C. under a load of 125 lbf using a (Falex)

TABLE 3

| Example Comparative Ex. | Oil-soluble nitrogen containing product | (1) Sludge dispersion and solubilization test | |
|---|---|---|---|
| | | Amount of nitrogen-containing product (wt %) | Amount of dissolved sludge stock solution (µl) |
| Ex. 14 | product of Ex. 1 | 0.1 | 60 |
| Ex. 15 | product of Ex. 1 | 0.5 | 500 |
| Ex. 16 | product of Ex. 1 | 1.0 | >1,000 |
| Ex. 17 | product of Ex. 2 | 0.1 | 60 |
| Comp. Ex. 1 | — | — | — |
| Comp. Ex. 2 | polybutenyl-succinimide | 0.1 | 40 |
| Comp. Ex. 3 | polybutenyl-amine | 0.1 | 40 |

| Example Comparative Ex. | Amount of oil-soluble nitrogen-containing product to purified mineral oil (wt %) | (2) Demulsibility test O-W-E (minutes) | (3) Rust-preventing performance test | (4) Friction reducing performance test |
|---|---|---|---|---|
| Ex. 14 | 0.1 | 41-36-3 (12) | not rusted | 0.072 |
| Ex. 15 | 0.5 | 40-37-3 (18) | not rusted | 0.070 |
| Ex. 16 | 1.0 | 40-37-3 (22) | not rusted | 0.070 |
| Ex. 17 | 0.1 | 40-37-3 (15) | not rusted | 0.062 |
| Comp. Ex. 1 | — | 42-38-0 (3) | rusted on entire surfaces | 0.082 |
| Comp. Ex. 2 | 0.1 | 2-0-78 (60) | rusted | 0.078 |
| Comp. Ex. 3 | 0.1 | 41-36-3 (30) | rusted | 0.078 |

As will be apparent from Examples 1 through 13, the oil-soluble nitrogen-containing products having high molecular weight hydrocarbon groups can be obtained by a simple one reaction step according to the process of the invention.

The results of Examples 14 through 17 and Comparative Examples 1 through 3 reveal that the products of the present invention have better detergency and dispersability (sludge dispersion and solubilization performance), demulsibility, rust-preventive property and friction reducing property and are thus useful as multifunctional additives for fuel oils and lubricating oils. More specifically, the results of Examples 14 through 16 reveal that when the amount is increased, the detergency and dispersability can be significantly improved without deterioration of the demulsibility.

In contrast, polybutenylsuccinimide (Comparative Example 2) and polybutenylamine (Comparative Example 3), which are widely employed detergent-dispersants, have relative good detergency and dispersability but are greatly inferior in rust preventive property and friction reducing property to the products of the present invention. In addition, with polybutenylsuccinimide, the demulsibility becomes considerably poor when added in an amount of 0.1 wt %.

The following examples illustrate preparation of oil-soluble nitrogen and boron-containing products.

EXAMPLE 18

500 parts by weight of N,N'-bis(gamma-aminopropyl)piperazine as a telogen and 1000 parts by weight of 1-octadecene as a taxogen were weighed and charged into a four neck distillation flask and heated up to 165° C. while agitating in an atmosphere of nitrogen. A mixture of 260 parts by weight of 1-octadecene and 146 parts by weight of di-t-butyl peroxide (DTBP) as a radical initiator was dropped portion by portion in 2 hours, followed by agitation for 2 hours while keeping the above temperature to conduct radical telomerization of the 1-octadecene using N,N'-bis(gamma-aminopropyl)piperazine as the telogen. The molar ratio of the taxogen and the telogen was 2.0 and the molar ratio of the radical initiator and the taxogen was 0.2.

After completion of the reaction, unreacted N,N'-bis(gamma-aminopropyl)piperazine and 1-octadecene were distilled off from the reaction mixture to obtain 850 parts by weight of a telomerization reaction product. The reaction product was subsequently mixed with 206 parts by weight of orthoboric acid and 776 parts by weight of n-butanol, followed by heating under reflux in an atmosphere of nitrogen at a reaction temperature of 100° C. for 2 hours. Thereafter, the reaction mixture was heated up to 170° C. and maintained for 2 hours, followed by distilling off the water formed by the reaction and the n-butanol. After completion of the reaction, the reaction mixture was purified according to the purification method (5), i.e. 2000 parts by weight of hexane was added for dilution to the mixture, followed by filtration through Celite. The hexane was distilled off from the filtrate to obtain 1,160 parts by weight of an oil-soluble nitrogen and boron-containing product.

The product had an average molecular weight of 1,450, a nitrogen content of 3.5 wt % and a boron content of 3.1 wt %.

EXAMPLE 19

328 parts by weight of di(trimethylene)triamine as a telogen and 900 parts by weight of a mixed alpha-olefin of 1-hexadecene and 1-octadecene as a taxogen (mixing ratio by weight of 57:43) were weighed and charged into a four neck distillation flask and heated up to 165° C. while agitating in an atmosphere of nitrogen. A mixture of 280 parts by weight of the mixed alpha-olefin and 146 parts by weight of DTBP as a radical initiator was dropped portion by portion in 2 hours, followed by agitation for 2 hours while keeping the above temperature to conduct the radical telomerization of the mixed alpha-olefin using the di(trimethylene)triamine as the telogen. The molar ratio of the taxogen and the telogen was 2.0 and the molar ratio of the radical initiator and the taxogen was 0.2.

After completion of the reaction, unreacted di(trimethylene)triamine and the mixed alpha-olefin were distilled off from the reaction mixture to obtain 845 parts by weight of a telomerization reaction product.

The products was mixed with 142 parts by weight of orthoboric acid and 535 parts by weight of n-butanol, followed by heating under reflux in a stream of nitrogen at a reaction temperature of 100° C. for 2 hours. Thereafter, the reaction mixture was heated up to 170° C. and maintained at the temperature for 2 hours to distill off the water formed by the reaction and the n-butanol. After completion of the reaction, the reaction mixture was passed through Celite according to the purification method (8) to obtain 890 parts by weight of an intended oil-soluble nitrogen and boron-containing product.

This product had an average molecular weight of 1,140, a nitrogen content of 2.7 wt % and a boron content of 2.5 wt %.

EXAMPLE 20

845 parts by weight of the telomerization reaction product obtained by the radical telomerization of Example 19 was mixed with 23.7 parts by weight of orthoboric acid and 390 parts by weight of toluene and heated under reflux in an atmosphere of nitrogen at a reaction temperature of 115° C. for 3 hours. The reaction mixture was heated up to 190° C. and maintained at the temperature for 24 hours to distill off the water formed by the reaction and the toluene. After completion of the reaction, the reaction mixture was passed through Celite according to the purification method (8) to obtain 850 parts by weight of an intended oil-soluble nitrogen and boron-containing product.

This product had an average molecular weight of 910, a nitrogen content of 4.1 wt % and a boron content of 0.14 wt %.

EXAMPLE 21

525 parts by weight of diethanolamine as a telogen and 600 parts by weight of 1-dodecene as a taxogen were weighed and charged into a four neck distillation flask and heated up to 165° C. while agitating in an atmosphere of nitrogen. A mixture of 240 parts by weight of 1-dodecene and 73 parts by weight of DTBP as a radical initiator was dropped into the mixture portion by portion in 2 hours, followed by agitating for further 2 hours while keeping the temperature to conduct the radical telomerization of the 1-dodecene using diethanolamine as the telogen. The molar ratio of the taxogen and the telogen was 2.0 and the molar ratio of the radical initiator and the taxogen was 0.1.

After completion of the reaction, unreacted diethanolamine and 1-dodecene were distilled off from the reaction mixture to obtain 378 parts by weight of a telomerization reaction product. Subsequently, the product was mixed with 107 parts by weight of trimethyl borate and 1,000 parts by weight of toluene and refluxed in an atmosphere of nitrogen at a reaction temperature of 115° C. for 3 hours. Thereafter, the reaction mixture was heated up to 190° C. and maintained at the temperature for 2 hours to distill off the toluene. After completion of the reaction, the reaction mixture was passed through Celite according to the purification method (8) to obtain 467 parts by weight of an intended oil-soluble nitrogen and boron-containing product.

This product had an average molecular weight of 830, a nitrogen content of 1.7 wt % and a boron content of 2.7 wt %.

EXAMPLES 22 THROUGH 25

Telogens (nitrogen-containing compounds), taxogens (alpha-olefins) and radical initiators indicated in Table 4 were used for radical telomerization of the taxogen with the telogen in the same manner as in the foregoing 18 through 21 under conditions indicated in Table 4.

After completion of the reaction, the unreacted telogen and taxogen were distilled off to obtain a telomerization reaction product. The reaction products and boron compounds and solvents indicated in Table 4 were used for boration in the same manner as in Examples 18 to 21 under conditions indicated in Table 4. The values in brackets in Table 4 indicate amounts in terms of parts by weight.

After completion of the reaction, the reaction mixture was purified according to the purification method indicated in Table 4, to obtain an intended oil-soluble nitrogen and boron-containing product. The average molecular weight, nitrogen content and boron content of the products are indicated in Table 5.

TABLE 4

|  | Example 18 | Example 19 | Example 20 | Example 21 |
|---|---|---|---|---|
| Radical telomerization step: | | | | |
| (a) Nitrogen-containing compound (telogen) | butylamine [730] | cyclohexanolamine [575] | N-(gamma-aminopropyl)morpholine [655] | hexamethylenediamine [580] |
| (b) Alpha-olefin (taxogen) | 1-dodecene [780] [280] | 1-dodecene + 1-tetradecene*1 [605] [300] | 1-dodecene + 1-tetradecene*1 [605] [300] | 1-hexadecene + 1-octadecene*2 [900] [280] |
| Radical initiator | DTBP [73] | DTBP [73] | DTBP [146] | DTBP [146] |
| Taxogen/telogen (molar ratio) | 0.5 | 1.0 | 2.0 | 1.0 |
| Radical Initiator/taxogen (molar ratio) | 0.1 | 0.2 | 0.2 | 0.2 |
| Reaction conditions: | | | | |
| Reaction temp. (°C.) | 150 | 165 | 165 | 165 |
| Dropping time of radical initiator + taxogen (hours) | 2.0 | 2.0 | 2.0 | 2.0 |
| Reaction time (hours) | 2.0 | 2.0 | 2.0 | 2.0 |
| Yield of telomer | [591] | [448] | [655] | [672] |
| Borating step: | | | | |
| Boron compound | orthoboric acid [50] | trimethyl borate [60] | orthoboric acid [110] | orthoboric acid [28] |
| Water, alcohol or hydrocarbon | n-butanol [188] | toluene [560] | n-butanol [400] | water + toluene [8] + [500] |
| Reaction conditions: | | | | |
| Reaction temp. (°C.) | 100 | 115 | 100 | 110 |
| Reaction time (hours) | 2 | 3 | 2 | 3 |
| Solvent-removing conditions: | | | | |
| Temperature (°C.) | 170 | 190 | 170 | 190 |
| Time (hours) | 2 | 2 | 2 | 2 |
| Purification method | (8) | (8) | (6) | (6) |
| Yield of oil-soluble nitrogen and boron-containing product | [638] | [471] | [745] | [687] |

*1: 1-dodecene:1-tetradecene = 54:44 (by weight)
*2: 1-hexadecene:1-octadecene = 57:43 (by weight)

TABLE 5

|  | Average molecular weight | Nitrogen content (wt %) | Boron content (wt %) |
|---|---|---|---|
| Example 22 | 830 | 1.2 | 1.0 |
| Example 23 | 810 | 1.6 | 1.3 |
| Example 24 | 900 | 3.2 | 2.5 |
| Example 25 | 1060 | 2.5 | 0.5 |

EXAMPLES 26–30 AND COMPARATIVE EXAMPLES 4–6

The products obtained in Examples 18 and 19 were subjected to the assessment tests as in Examples 14–17 except that a wear preventive performance test (5) and an extreme pressure performance test (6) were further effected as follows.

(5) Wear preventive performance test An abrasion wear (mg) of a test pin was measured using a (Falex) tester under a load of 250 lbf at an oil temperature of 60° C. 1 hour after commencement of the operation.

(6) Extreme pressure performance test

A load (1b) at which seizing took place when the load was stepwise increased at an oil temperature of 60° C. in a (Falex) tester was determined.

The results are shown in Table 6.

For comparison, a refined mineral oil itself, polybutenylsuccinimide of the type as used in Comparative Example 2 and borated polybutenylsuccinimide (which was obtained by borating polybutenylsuccinimide and had a nitrogen content of 4.6 wt % and a boron content of 1.0 wt %) were used for the assessment tests. The results are also shown in Table 6.

TABLE 6

| Example Comparative Ex. | Oil soluble nitrogen and boron-containing product | (1) Sludge dispersion and solubilization test | |
|---|---|---|---|
| | | Amount of the product (wt %) | Amount of dissolved sludge stock solution (μl) |
| Ex. 26 | product of Ex. 18 | 0.1 | 60 |
| Ex. 27 | product of Ex. 19 | 0.1 | 60 |
| Ex. 28 | product of Ex. 19 | 0.5 | 500 |
| Ex. 29 | product of Ex. 19 | 1.0 | >1000 |
| Ex. 30 | product of Ex. 19 | 2.0 | >1000 |
| Comp. Ex. 4 | — | — | — |
| Comp. Ex. 5 | polybutenyl-succinimide | 0.5 | 300 |
| Comp. Ex. 6 | borated poly-butenylsuccinimide | 0.5 | 300 |

| Example Comparative Ex. | Amount added | (2) Demulsibility test O-W-E (minutes) | (3) Rust-preventing performance test | (4) Friction reducing performance test |
|---|---|---|---|---|
| Ex. 26 | 0.1 | 40-37-3 (10) | not rusted | 0.070 |
| Ex. 27 | 0.1 | 40-37-3 (9) | not rusted | 0.062 |
| Ex. 28 | 0.5 | 40-37-3 (13) | not rusted | 0.060 |
| Ex. 29 | 1.0 | 40-37-3 (20) | not rusted | 0.065 |
| Ex. 30 | 2.0 | 40-37-3 (28) | not rusted | 0.068 |
| Comp. Ex. 4 | — | 42-38-0 (3) | rusted on entire surfaces | 0.082 |
| Comp. Ex. 5 | 0.5 | 0-0-80 (60) | rusted | 0.079 |
| Comp. Ex. 6 | 0.5 | 0-0-80 (60) | rusted | 0.078 |

| | (5) Wear-preventive performance test (mg) | (6) Extreme pressure performance test (lb) |
|---|---|---|
| Ex. 26 | 15.2 | 580 |
| Ex. 27 | 10.6 | 530 |
| Ex. 28 | 2.0 | 730 |
| Ex. 29 | 1.6 | 850 |
| Ex. 30 | 0.8 | 1100 |
| Comp. Ex. 4 | seized | 340 |
| Comp. Ex. 5 | seized | 480 |
| Comp. Ex. 6 | 29.6 | 640 |

As will be apparent from Examples 18 through 25, the oil-soluble nitrogen and boron-containing products having high molecular weight hydrocarbon groups can be obtained by a simple two-step reaction procedure according to the process of the invention.

The results of Examples 26 through 30 and Comparative Examples 4 through 6 reveal that the products of the present invention have better detergency and dispersability (sludge dispersion and solubilization performance), demulsibility, rust-preventive property and friction reducing property and are thus useful as multi-functional additives for fuel oils and lubricating oils similar to the boron-free products of the present invention. The results of Examples 26 through 30 reveal that when the amount is increased, the detergency and dispersability can be significantly improved without deterioration of the demulsibility.

In contrast, polybutenylsuccinimide (Comparative Example 5) and its borated product (Comparative Example 6), which are widely employed detergent-dispersants, are greatly inferior in detergency and dispersability, rust preventive property and friction reducing property to the products of the present invention. In addition, with polybutenylsuccinimide and its borated product, the demulsibility becomes considerably poor.

What is claimed is:

1. A process of preparing a nitrogen-containing telomer containing a high molecular weight hydrocarbon group, of average molecular weight between 400 and 3,000, nitrogen content of from 0.1 to 10 wt %, soluble in fuel oils and lubricating oils, which consists of subjecting to a radical telomerization reaction in the presence of a radical initiator at a temperature of 150° C.–200° C. a mixture of 1 mole of: (1) at least one nitrogen-containing compound as a telogen which is an alkanolamine or a cycloalkanolamine of formula

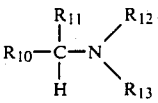

in which $R_{10}$ represents an alkanol group having at least one hydroxyl group and having from 1 to 45 carbon atoms, $R_{11}$, $R_{12}$ and $R_{13}$ independently represent a hydrogen atom, an alkyl group having from 1 to 45 carbon atoms or an alkanol group having at least one hydroxyl group and having from 1 to 45 carbon atoms, or $R_{10}$ and $R_{11}$ join to form a five- to seven-members saturated ring having at least one hydroxyl group, the ring being unsubstituted or substituted by 1–3 alkyl substituents each having from 1 to 6 carbon atoms, and (2) 0.1 to 20 moles of an alpha-olefin as a taxogen of the general formula $R_5-CH=CH_2$, in which $R_5$ is alkyl having from 1 to 28 carbon atoms whereby said taxogen becomes attached to the carbon atom in the α-position to the nitrogen atom of said telogen.

2. A process of preparing a nitrogen-containing telomer containing a high molecular weight hydrocarbon group, of average molecular weight between 400 to 3,000, nitrogen content of from 0.1 to 10 wt %, soluble in fuel oils and lubricating oils, which consists of subjecting to a radical telomerization reaction in the presence of a radical initiator at a temperature of 150° C.-200° C. a mixture of 1 mole of: (1) a nitrogen-containing compound as a telogen which is a heterocyclic amine of formula:

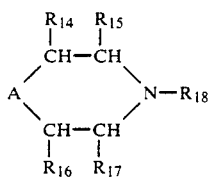

in which $R_{14}$, $R_{15}$, $R_{16}$ and $R_{17}$ independently are a hydrogen atom or alkyl having from 1 to 6 carbon atoms, $R_{18}$ is a hydrogen atom, an alkyl having from 1 to 6 carbon atoms, an aminoalkyl group having from 1 to 2 amino groups and from 1 to 6 carbon atoms or a hydroxyalkyl having from 1 to 2 hydroxyl groups and from 1 to 6 carbon atoms, and A is an oxygen atom or a group of the general formula

in which $R_{20}$ is (a) H, (b) alkyl of 1-6 carbon atoms, (c) aminoalkyl of 1-2 amino groups and 1-6 carbon atoms, or (d) hydroxyalkyl of 1-2 hydroxyl group and 1-6 carbon atoms and (2) 0.1 to 20 moles of an alpha-olefin as a taxogen of the general formula, $R_5-CH=CH_2$, in which $R_5$ represents a hydrogen atom or an alkyl group having from 1 to 28 carbon atoms whereby said taxogen becomes attached to the carbon atom in the $\alpha$-position to the nitrogen atom of said telogen.

3. A process of preparing a nitrogen-containing telomer containing a high molecular weight hydrocarbon group, of average molecular weight between 400 and 3,000, nitrogen content of from 0.1 to 10 wt %, soluble in fuel oils and lubricating oils, which consists of subjecting to a radical telomerization reaction in the presence of a radical initiator at a temperature of 150° C.-200° C. a mixture of 1 mole of: (1) a nitrogen-containing compound as a telogen which is a diamine of formula

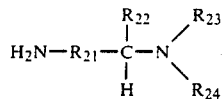

in which $R_{21}$ represents a divalent hydrocarbon group having from 1 to 45 carbon atoms, $R_{22}$, $R_{23}$ and $R_{24}$ independently represent a hydrogen atom or alkyl having from 1 to 45 carbon atoms or $R_{21}$ and $R_{22}$ join to form a five- to seven-membered saturated aliphatic ring which is unsubstituted or substituted by 1 to 3 alkyl substituents each having from 1 to 6 carbon atoms and (2) 0.1 to 20 moles of an alpha-olefin as a taxogen of the general formula $R_5-CH=CH_2$, in which $R_5$ is alkyl having from 1 to 28 carbon atoms whereby said taxogen becomes attached to the carbon atom in the $\alpha$-position to the nitrogen atom of said telogen.

4. A process of preparing a nitrogen-containing telomer containing a high molecular weight hydrocarbon group, of average molecular weight between 400 and 3,000, nitrogen content of from 0.1 to 10 wt %, soluble in fuel oils and lubricating oils, which consists of subjecting to a radical telomerization reaction in the presence of a radical initiator at a temperature of 150° C.-200° C. a mixture of (1) a telogen which is a nitrogen-containing compound which is a polyamine of formula

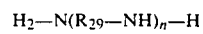

in which $R_{29}$ is an ethylene group, a propylene group, or a trimethylene group, and n is an integer of from 2 to 11, and (2) 0.1 to 20 moles of an alpha-olefin as a taxogen of the general formula $R_5-CH=CH_2$, in which $R_5$ is alkyl having from 1 to 28 carbon atoms whereby said taxogen becomes attached to the carbon atom in the $\alpha$-position to the nitrogen atom of said telogen.

5. A process according to claims 1, 2, 3 or 4 wherein said radical initiator is a peroxide.

6. A process according to claims 1, 2, 3 or 4 wherein said peroxide is used in an amount of from 0.005 to 0.3 moles per mole of said taxogen.

7. A process according to claims 1, 2, 3 or 4 wherein said radical telomerization reaction is effected by application of actinic light having a wavelength not higher than 300 nm.

8. A process according to claims 1, 2, 3 or 4 wherein said radical telomerization is effected in the presence of a radical initiator while applying actinic light having a wavelength not higher than 300 nm.

9. The process according to claims 1, 2, 3 or 4, further comprising reacting said nitrogen-containing telomer with a boron compound which is at least one member selected from the group consisting of boron acids, boron oxides, boron halides, borates and low alkyl esters of boron acid at a temperature of from 50° to 250° C., thereby obtaining an oil-soluble nitrogen and boron-containing compound having an average molecular weight not less than 300, a nitrogen content of from 0.1 to 10 wt % and a boron content of from 0.05 to 7.0 wt %.

10. The process according to claims 1, 2, 3 or 4, further comprising reacting said nitrogen-containing telomer with a boron compound which is at least one member selected from the group consisting of boron acids, boron oxides, boron halides, borates and low alkyl esters of boron acid at a temperature of from 50° to 250° C., thereby obtaining an oil-soluble nitrogen and boron-containing compound having an average molecular weight not less than 300, a nitrogen content of from 0.1 to 10 wt % and a boron content of from 0.05 to 7.0 wt % wherein the ratio in number of the nitrogen atoms to the boron atoms in said nitrogen and boron-containing compound is in the range of 1:0.05 to 5.

11. The process according to claims 1, 2, 3 or 4, further comprising reacting said nitrogen-containing telomer with a boron compound which is at least one member selected from the group consisting of boron acids, boron oxides, boron halides, borates and low alkyl esters of boron acid at a temperature of from 50° to 250° C., thereby obtaining an oil-soluble nitrogen and boron-containing compound having an average molecular weight not less than 300, a nitrogen content of from 0.1 to 10 wt % and a boron content of from 0.05 to 7.0 wt % wherein the ratio in number of the nitrogen atoms to the boron atoms in said nitrogen and boron-containing compound is in the range of 1:0.05 to 5 and said boron atoms are coordinated at the nitrogen atom.

12. A process according to claim 1 wherein said telogen is an alkanolamine in which at least $R_{11}$ and $R_{12}$ independently represent a hydrogen atom.

13. A process according to claim 1 wherein said telogen is a cycloalkanolamine in which $R_{10}$ and $R_{11}$ join to form a five- to seven-membered saturated aliphatic ring and at least $R_{12}$ is a hydrogen atom.

14. The process according to claim 5 wherein in said diamine at least $R_{22}$ and $R_{23}$ independently represent a hydrogen atom.

15. The process according to claim 3 wherein in said diamine $R_{21}$ and $R_{22}$ join to form a ring and at least $R_{23}$ represents a hydrogen atom.

* * * * *